(12) United States Patent
Tabata et al.

(10) Patent No.: US 7,347,183 B2
(45) Date of Patent: Mar. 25, 2008

(54) CONTROL APPARATUS AND CONTROL METHOD FOR ENGINE

(75) Inventors: Masakazu Tabata, Susono (JP); Tomohiro Kaneko, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/579,001

(22) PCT Filed: Mar. 31, 2006

(86) PCT No.: PCT/JP2006/307407

§ 371 (c)(1),
(2), (4) Date: Oct. 30, 2006

(87) PCT Pub. No.: WO2006/104283

PCT Pub. Date: May 10, 2006

(65) Prior Publication Data

US 2007/0240679 A1    Oct. 18, 2007

(30) Foreign Application Priority Data

Mar. 31, 2005 (JP) ............................. 2005-103629
Mar. 31, 2005 (JP) ............................. 2005-103635

(51) Int. Cl.
   *F02D 45/00*   (2006.01)
   *F02D 9/02*    (2006.01)
   *F02D 13/02*   (2006.01)
   *F02B 27/02*   (2006.01)

(52) U.S. Cl. ..................... 123/336; 73/118.2; 123/403; 123/406.47; 123/494

(58) Field of Classification Search ................ 123/336, 123/402–405, 406.12, 406.47, 478, 480, 123/494; 73/118.2

See application file for complete search history.

(56) References Cited

U.S. PATENT DOCUMENTS

| | | | | | |
|---|---|---|---|---|---|
| 5,638,788 | A | * | 6/1997 | Sanvido et al. | 123/339.2 |
| 6,422,184 | B1 | * | 7/2002 | Kreuter | 123/184.54 |
| 6,886,517 | B2 | * | 5/2005 | Linhart et al. | 123/184.53 |

FOREIGN PATENT DOCUMENTS

| | | |
|---|---|---|
| JP | 63-120819 | 5/1988 |
| JP | 11-287136 | 10/1999 |
| JP | 2000-248946 | 9/2000 |
| JP | 2002-089338 | 3/2002 |
| JP | 2003-193845 | 7/2003 |
| WO | WO 2005/038211 A1 | 4/2005 |

* cited by examiner

*Primary Examiner*—T. M. Argenbright
(74) *Attorney, Agent, or Firm*—Kenyon & Kenyon LLP

(57) ABSTRACT

For accurately estimating an air quantity flowing into a cylinder at the time of operating an intake control valve, a control apparatus for an engine according to the present invention is provided with an intake control valve which can open/close an intake passage in synchronization with opening/closing of an intake valve, intake control valve controlling means which opens the intake control valve in the midst of the intake stroke and thereafter, closes the intake control valve, and air quantity estimating means which estimates an air quantity flowing into a cylinder after the intake control valve has opened, based upon opening timing of the intake control valve, closing timing or an opening period of the intake control valve, and a pressure at a downstream side of the intake control valve at the opening timing of the intake control valve.

24 Claims, 38 Drawing Sheets

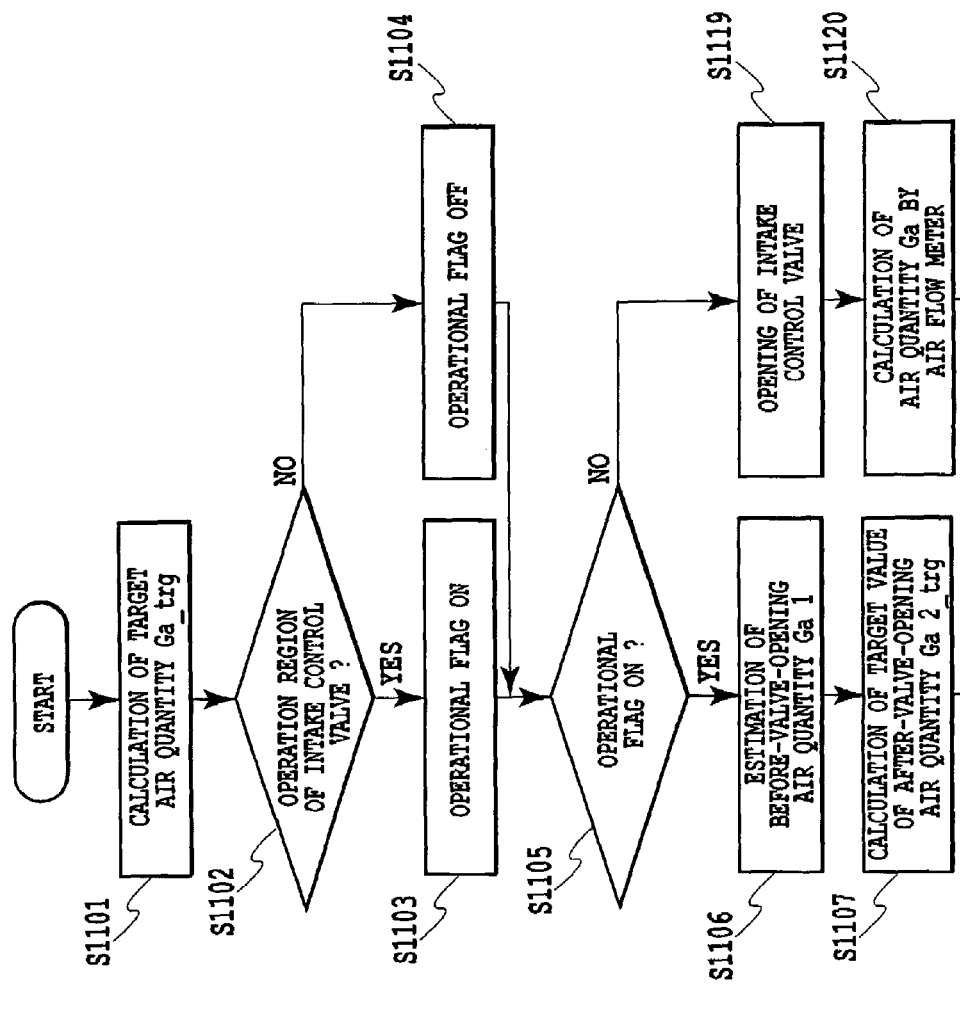

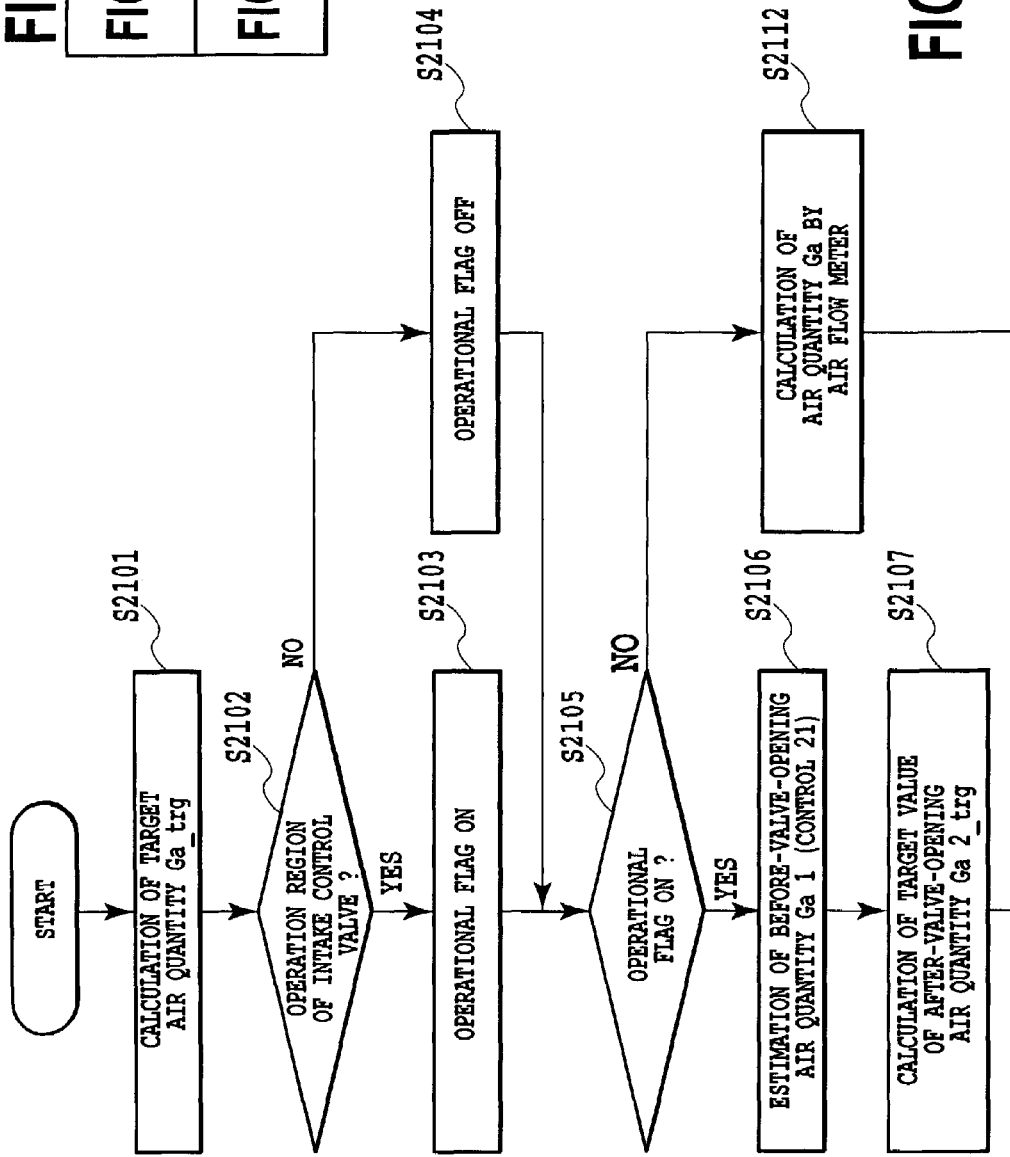

CONTROL APPARATUS AND CONTROL METHOD FOR ENGINE

This is a 371 national phase application of PCT/JP2006/307407 filed 31 Mar. 2006, claiming priority to Japanese Patent Applications No. 2005-103629 and No. 2005-103635 both filed 31 Mar. 2005, the contents of which are incorporated herein by reference.

TECHNICAL FIELD

The present invention relates to a control apparatus and a control method for an engine and in particular, to a control apparatus and a control method for an engine which is capable of increasing an air quantity flowing into a cylinder by an intake control valve disposed in an intake passage.

BACKGROUND ART

It is known that an intake control valve is located in an intake passage at a location upstream of an intake valve to close the intake passage and opens/closes in synchronization with opening/closing of the intake valve. The intake control valve is opened momentarily in the midst of an intake stroke to fill a great deal of intake air into a cylinder by using an inertia supercharging effect or a pressure fluctuation of the intake air (for example, refer to JP-A-2000-248946). Since the intake control valve can open and close during one intake stroke, such supercharging can start at the same time an accelerator pedal is depressed and is better in responsiveness than turbo charging which starts due to rise of a turbine. Therefore, for example, such supercharging is suitable for eliminating an acceleration delay of a vehicle. In addition, the supercharging can increase an intake air quantity more than a normal aspiration, thereby increasing torque generated by the engine.

In the meantime, there is a case where in the engine control, an air quantity flowing into a cylinder is estimated for each cylinder cycle to set a fuel injection quantity, fuel injection timing, ignition timing and the like. In this case, the estimation of the air quantity is made based upon a detection value of an intake air quantity detected by an air flow meter or a detection value of an intake pressure sensor.

In the case of using the intake control valve as described above, however, the flowing intake air quantity changes for each intake cycle in response to operation timing of the intake control valve. Therefore, a method of using the detection value of the air flow meter or the intake pressure sensor can not adapt for responding to the change of the air quantity for each intake cycle, resulting in being incapable of accurately detecting the air quantity. In other words, in the method of using the detection value of the air flow meter or the intake pressure sensor, only an average air quantity flowing into the cylinder can be estimated, and a fluctuation quantity can not be estimated in the case where the air quantity per intake cycle unit changes. Further, the method of using the detection value of the air flow meter or the intake pressure sensor can not adapt for responding to a change of the air quantity in a case where the intake control valve changes from a non-operating state to an operating state or vice versa.

It should be noted that in a variable valve system capable of setting any opening/closing timing of an intake valve, an estimation of an air quantity is possible, estimating a port pressure at a point the intake valve of each cylinder closes. In the system using the intake control valve as described above, however, a port portion creates a subsonic speed, where the pressure is abruptly changed and a temperature of the intake air changes due thereto. Therefore, it is extremely difficult to estimate the port pressure at a point the intake valve closes, by means of the air flow meter or the like and even if the port pressure is estimated, it inevitably results in that the obtained air quantity is inaccurate.

On the other hand, there is a case where in an engine control, a target air quantity as a target value of an air quantity flowing into the cylinder is determined based upon a parameter representative of an engine operating condition such as an engine rotational speed or an accelerator opening to control the air quantity so that an actual air quantity be equal to the determined target air quantity and also to set a fuel injection quantity, fuel injection timing, ignition timing and the like, based upon the target air quantity. In general, an opening of the intake throttle valve is controlled to make an actual air quantity be equal to a target air quantity.

In a case of adopting the aforementioned intake control valve, opening/closing timing of the intake control valve is controlled, thereby leading to controlling an air quantity. Accordingly, for acquiring a desired air quantity, it is required to open/close the intake control valve at appropriate timing.

DISCLOSURE OF THE INVENTION

The present invention has been made from the foregoing problems. An object of the present invention is to provide a control apparatus and a control method for an engine which can accurately estimate an air quantity flowing into a cylinder at the time of operating an intake control valve.

And, another object of the present invention is to provide to a control apparatus and a control method for an engine which can open/close an intake control valve at appropriate timing.

A control apparatus for an engine according to a first aspect of the present invention comprises an intake control valve disposed in an intake passage at an upstream side of an intake valve to close the intake passage and also open/close in synchronization with opening/closing of the intake valve, intake control valve controlling means which opens the intake control valve in the midst of an intake stroke and thereafter, closes the intake control valve, and air quantity estimating means which estimates an air quantity flowing into a cylinder after the opening of the intake control valve, based upon opening timing of the intake control valve, closing timing or an opening period of the intake control valve and a pressure at a downstream side of the intake control valve at the opening timing of the intake control valve.

The inventors have found out, as a result of great research and study, to be capable of estimating an air quantity flowing into a cylinder when the intake control valve is opened, based upon opening timing of the intake control valve, closing timing or an opening period of the intake control valve and a pressure at the downstream side of the intake control valve at the opening timing of the intake control valve. Generally, in a case of being designed to increase the flowing air quantity, it is effective to lower the pressure at the downstream side of the intake control valve (a difference in pressure between the upstream side and the downstream side of the intake control valve increases to increase a flow speed at the time of the opening). Accordingly it is effective to delay the opening timing (the similar reason), or appropriately provide the opening period (the intake control valve closes immediately before the air flows back). The first aspect of the present invention is made based upon the findings of the inventors and estimates an air quantity based upon these three parameters, thereby making it possible to accurately estimate the air quantity flowing into the cylinder.

Herein, the air quantity estimating means may determine the opening timing of the intake control valve and the closing timing or the opening period of the intake control valve, based upon an operating condition of the engine.

It is preferable that the air quantity estimating means estimates the air quantity according to a map using the opening timing, the opening period and the pressure as parameters.

It is preferable that there is further provided pressure detecting means which detects a pressure at the downstream side of the intake control valve, wherein the air quantity estimating means defines, as the pressure, a pressure value detected at the opening timing of the intake control valve by the pressure detecting means or a pressure value estimated by the detected pressure value.

It is preferable that there is further provided control amount determining means which determines a control amount based upon the air quantity estimated by the air quantity estimating means. This control amount is, for example, at least one of a fuel injection quantity, fuel injection timing and ignition timing.

It is preferable that the intake control valve controlling means closes the intake control valve in such a manner as to retain a pressure different from an average pressure at the upstream side of the intake control valve or a pressure equal to the average pressure at the upstream side of the intake control valve in the intake passage between the intake control valve and the intake valve from an end of the intake stroke to the next intake stroke.

According to the above, in a case of setting overlap between opening periods of the intake valve and an exhaust valve, the retained pressure is used to reduce backflow of the in-cylinder remaining gas or to scavenge the in-cylinder remaining gas into an exhaust system, thus increasing the air quantity into the cylinder.

In addition, It is preferable that there is further provided before-valve-opening air quantity estimating means which estimates a before-valve-opening air quantity flowing into the cylinder before the opening of the intake control valve, based upon the retained pressure and the pressure at the downstream side of the intake control valve at a predetermined timing after the opening of the intake valve and also at or before the opening timing of the intake control valve.

The air quantity flowing into the cylinder from the intake passage at the downstream side of the intake control valve before the opening of the intake control valve is equal to an air quantity reduced from the downstream-side intake passage. Since the volume of the downstream-side intake passage is geometrically determined and a known, constant value, the before-valve-opening air quantity can be estimated based upon a change of the air density inside the downstream-side intake passage for a period from before the opening of the intake valve to before the opening of the intake control valve. A ratio of the air density before and after the change has a correlation with a pressure ratio of the two pressures. Accordingly, the before-valve-opening air quantity can be estimated based upon the two pressures.

It is preferable that there is further provided pressure detecting means which detects a pressure at the downstream side of the intake control valve, wherein the before-valve-opening air quantity estimating means defines a pressure value detected at a predetermined timing before the opening of the intake valve by the pressure detecting means as the retained-pressure, and a pressure value detected at a predetermined timing after the opening of the intake valve and also at or before the opening timing of the intake control valve by the pressure detecting means as the pressure at the downstream side. It should be noted that the retained pressure is not limited to the control for retaining the pressure at the previous intake stroke.

It is preferable that the control amount is determined based upon a sum of the air quantity estimated by the air quantity estimating means and the before-valve-opening air quantity estimated by the before-valve-opening air quantity estimating means.

A control method for an engine according to a second aspect of the present invention comprises a step of providing an intake control valve in an intake passage at an upstream side of an intake valve to close the intake passage and also open/close in synchronization with opening/closing of the intake valve, a step of opening the intake control valve in the midst of an intake stroke and thereafter, closing the intake control valve, and a step of estimating an air quantity flowing into a cylinder after the opening of the intake control valve, based upon opening timing of the intake control valve, closing timing or an opening period of the intake control valve and a pressure at a downstream side of the intake control valve at the opening timing of the intake control valve.

It is preferable that the step of closing the intake control valve includes closing the intake control valve in such a manner as to retain a pressure greater than an average pressure at the upstream side of the intake control valve in the intake passage between the intake control valve and the intake valve from an end of the intake stroke to the next intake stroke and there is further provided a step of estimating a before-valve-opening air quantity flowing into the cylinder before the opening of the intake control valve, based upon the retained pressure and the pressure at the downstream side of the intake control valve at a predetermined timing after the opening of the intake valve and also at or before the opening timing of the intake control valve.

It is preferable that there is further provided a step of detecting a pressure at the downstream side of the intake control valve.

A control apparatus for an engine according to a third aspect of the present invention comprises an intake control valve disposed in an intake passage at an upstream side of an intake valve to close the intake passage and also open/close in synchronization with opening/closing of the intake valve, intake control valve controlling means which opens the intake control valve in the midst of an intake stroke and thereafter, closes the intake control valve, and target air quantity determining means which determines a target value of an after-valve-opening air quantity flowing into the cylinder after the opening of the intake control valve, based upon an operating condition of the engine, pressure detecting means which detects a pressure at a downstream side of the intake control valve, pressure estimating means which estimates, based upon the downstream-side pressure detected before the opening of the intake control valve by the pressure detecting means, a downstream-side pressure after that detection timing, and target valve-opening-timing determining means which determines a target value of opening timing of the intake control valve, based upon the downstream-side pressure estimated by the pressure estimating means and the target value of the after-valve-opening air quantity.

The inventors have found out, as a result of great research and study, a close relation among the opening timing of the intake control valve, the opening period of the intake control valve, the pressure at the downstream side of the intake control valve at the opening timing of the intake control valve, and the air quantity (i.e., after-valve-opening air quantity) flowing into the cylinder when the intake control valve is opened. Generally, in a case of being designed to increase a flowing air quantity, it is effective to lower the pressure at the downstream side of the intake control valve (a difference in pressure between the upstream side and the downstream side of the intake control valve increases and this increases a flow speed at the time of the valve opening). Accordingly it is effective to delay valve opening timing (the similar reason) or to appropriately provide a valve opening period (the intake control valve closes immediately before the air flows back). The third aspect of the present invention is made based upon the findings of the inventors. The relation of such four factors can be replaced by the relation of the three factors other than the valve opening period by, for example, adopting the maximum air quantity of each valve opening period. It is thus possible to determine the target value of the valve opening timing based upon the downstream-side pressure of the intake control valve and the target value of the after-valve-opening air quantity.

It is preferable that the pressure estimating means estimates the downstream-side pressure of the intake control valve after the final detection time, based upon at least one of the downstream-side pressures detected before the opening of the intake control valve by the pressure detecting means.

It is preferable that there is further provided downstream-side pressure determining means which determines the downstream-side pressure at the target value of the valve opening timing based upon the target value of the air quantity and the target value of the valve opening timing.

It is preferable that there is further provided target valve-opening-period determining means which determines a target value of the valve opening period of the intake control valve based upon the target value of the valve opening timing, the downstream-side pressure at the target value of the valve opening timing and the target value of the air quantity.

It is preferable that the target valve-opening timing determining means and the target valve-opening period determining means respectively determine the respective target values of the valve opening timing and the valve opening period based upon a map predetermining a relation of the after-valve-opening air quantity, the downstream-side pressure, the valve opening timing and the valve opening period.

It is preferable that there are further provided valve-opening detecting means which detects an actual opening of the intake control valve and target valve-closing timing determining means which determines a target value of the closing timing of the intake control valve based upon timing when the actual opening is detected by the valve-opening detecting means and the target value of the valve opening period.

There exist a time lag between target valve opening timing and actual valve opening timing and a time lag between target valve closing timing and actual valve closing timing, and this time lag varies due to various factors. This variation causes variations in an intake air quantity. According to such construction, since the target valve closing timing is calculated from the actual valve opening timing, the time lag from the target valve opening timing to the actual valve opening timing can be ignored, making it possible to restrict the variations in air quantity by reducing factors of the variations.

It is preferable that there is further provided valve closing detecting means which detects an actual valve closing when the intake control valve controlling means closes the intake control valve at the target value of the valve closing timing determined by the target valve-closing timing determining means, actual valve-opening-period determining means which determines an actual valve opening period of the intake control valve, based upon the timing when the actual valve closing is detected by the valve-closing detecting means and the timing when the actual valve opening is detected, and actual air quantity estimating means which estimates an actual air quantity based upon the actual valve opening period determined by the actual valve-opening-period determining means, the timing when the actual valve opening is detected, and the downstream-side pressure detected by the pressure detecting means at the timing when the actual valve opening is detected.

It is preferable that there is further provided control amount determining means which determines a control amount based upon the actual air quantity estimated by the actual air quantity-estimating means.

This control amount is at least one of, for example, the fuel injection quantity, the fuel injection timing and the ignition timing.

A control apparatus for an engine according to a fourth aspect of the present invention comprises an intake control valve disposed in an intake passage at an upstream side of an intake valve to close the intake passage and also open/close in synchronization with opening/closing of the intake valve, an intake control valve controlling means which opens the intake control valve in the midst of an intake stroke and thereafter, closes the intake control valve, target air quantity determining means which determines a target value of an after-valve-opening air quantity flowing into a cylinder after the opening of the intake control valve, based upon an operating condition of the engine, pressure detecting means which detects a pressure at a downstream side of the intake control valve, pressure estimating means which estimates, based upon the downstream-side pressure detected before the opening of the intake control valve by the pressure detecting means, a downstream-side pressure after that detection timing, target valve-opening-timing determining means which determines a target value of opening timing of the intake control valve, based upon the downstream-side pressure estimated by the pressure estimating means and the target value of the after-valve-opening air quantity, target valve-opening-period determining means which determines a target value of an opening period of the intake control valve based upon the target value of the valve opening timing determined by the target-valve-opening-timing determining means, the downstream-side pressure at the target value of the valve opening timing, and the target value of the after-valve-opening air quantity, valve-opening detecting means which detects an actual opening of the intake control valve when the intake control valve is opened by the intake control valve controlling means at the target value of the valve opening timing and target valve-closing timing determining means which determines a target value of the closing timing of the intake control valve based upon timing when the actual opening is detected by the valve-opening detecting means and the target value of the valve opening period.

It is preferable that the target air quantity determining means determines a target value of the air quantity based upon an operating condition of the engine and also subtracts the estimation value of the before-valve-opening air quantity flowing into the cylinder before the opening of the intake control valve from the target value of the air quantity to determine the target value of the after-valve-opening air quantity.

It is preferable that the target air quantity determining means estimates the before-valve-opening air quantity, based upon at least two downstream-side pressures detected before the opening of the intake control valve by the pressure detecting means.

It is preferable that at least one downstream-side pressure of at least two downstream-side pressures includes the downstream-side pressure detected before the opening of the intake valve by the pressure detecting means.

According to the present invention, an excellent effect is achieved, which is capable of accurately estimating an air quantity flowing into a cylinder at the time of operating an intake control valve.

In addition, according to the present invention, an excellent effect is achieved, which is capable of opening/closing an intake control valve at appropriate timing.

BRIEF DESCRIPTION OF THE DRAWINGS

FIG. 3 is a block diagram showing a relation between FIG. 3A and FIG. 3B;

FIGS. 3A and 3B are flow charts of main routines in a first embodiment of an engine control;

FIG. 23 is a block diagram showing a relation between FIG. 23A and FIG. 23B;

FIGS. 23A and 23B are flow charts of main routines in a second embodiment of an engine control;

BEST MODE FOR CARRYING OUT THE INVENTION

The best mode for carrying out the present invention will be hereinafter explained with reference to the accompanying drawings.

Figure 1:
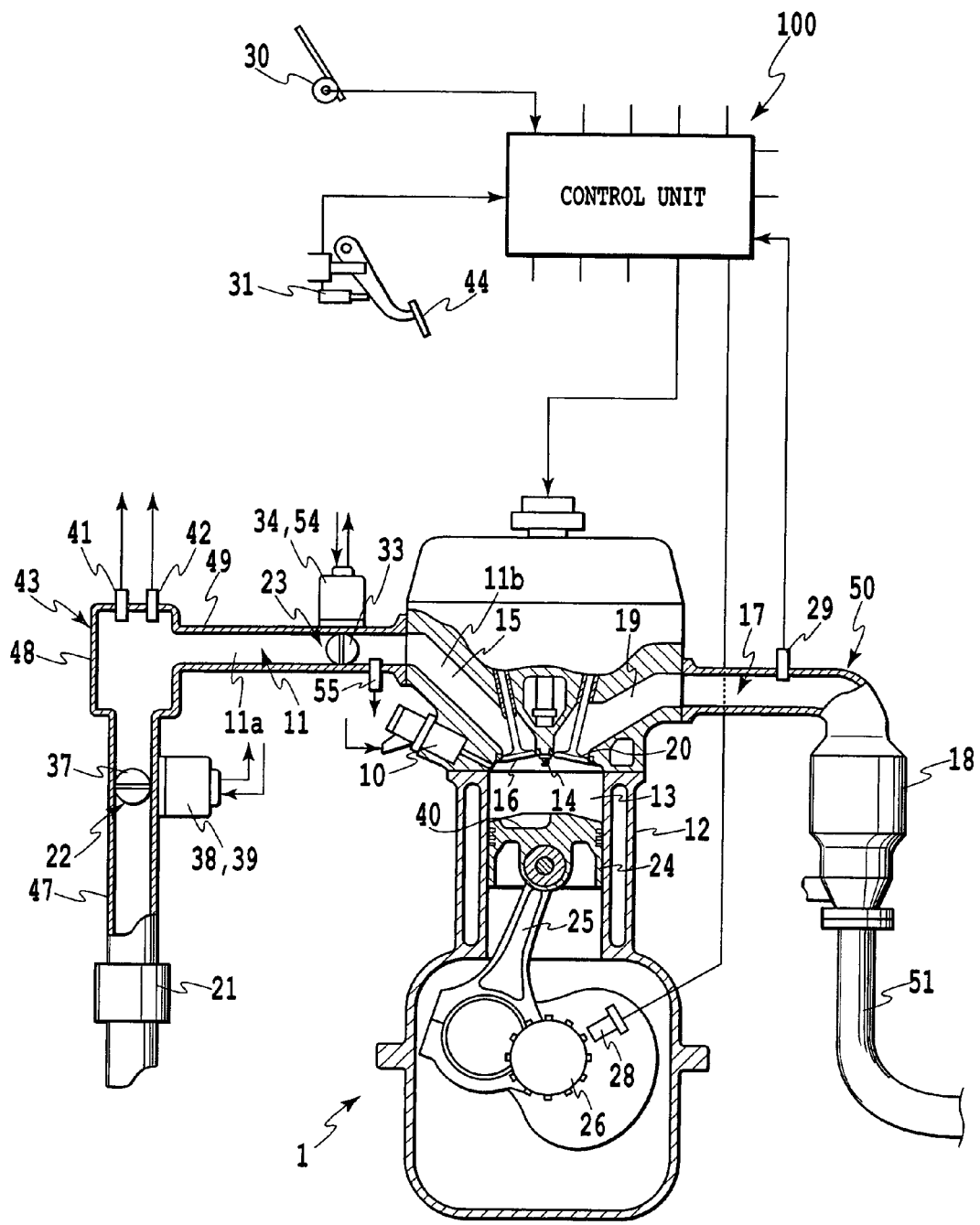
FIG. 1 is a system diagram schematically showing the construction of a control apparatus for an engine according to an embodiment of the present invention.

FIG. 1 schematically shows the construction of a control apparatus for an engine in a present embodiment. In the present embodiment, an engine 1 is a vehicular multi-cylinder gasoline engine (the figure shows only a first cylinder), which is structured in such a manner that fuel made of gasoline is directly injected from an injector 10 into a combustion chamber 13 in a cylinder 12 to ignite a mixture formed with this by an ignition plug 14, discharging an exhaust gas through an exhaust passage 17.

The engine is thus a so-called direct injection type and is designed so as to be capable of carrying out the following stratified combustion. That is, fuel is injected toward a concave portion 40 formed in a crown portion of a piston 24 from the injector 10 during rising of the piston 24, fuel and air are mixed in the process of forming flow of a tumble-shaped fuel spray swirling up along an inner surface of the concave portion 40, a relatively rich mixture layer is formed in the vicinity of the ignition plug 14 and a relatively lean mixture layer is formed around the rich mixture layer. The mixture is thus stratified, realizing the stratified combustion. According to the stratified combustion, a fuel-air ratio of the entire combustion chamber is largely leaner than a theoretical air-fuel ratio and at the same time, proper ignition combustion is secured, achieving a great improvement of a fuel economy. It should be noted that an engine can achieve combustion other than the lean combustion, such as a stoichiometric combustion in which an air-fuel ratio of the entire combustion chamber is generally a theoretical air-fuel ratio.

An intake passage 11 is, as is known, defined by an intake pipe 47, an intake manifold 43 and an intake port 15, which are connected in that order from the upstream side. The intake manifold 43 includes a surge tank 48 as a common joint portion in each cylinder and a branch pipe 49 of each cylinder. An outlet of the intake port 15 is opened/closed by an intake valve 16. The exhaust passage 17 is, as is known, defined by an exhaust port 19, an exhaust manifold 50, a catalyst 18 and an exhaust pipe 51, which are connected in that order from the upstream side. An inlet of the exhaust port 19 is opened/closed by an exhaust valve 20. In the present embodiment, the intake valve 16 and the exhaust valve 20 are mechanically opened/closed in a certain cycle by a cam shaft (not shown) rotated in a cycle ½ times that of a crank shaft 26 by the crank shaft 26, but valve opening timing and a valve opening period of each of the intake valve 16 and the exhaust valve 20 may be controlled in accordance with an engine operating condition by a variable valve timing mechanism, an actuator or the like. The present embodiment provides the overlap between opening periods of the intake valve 16 and the exhaust valve 20, but may be not limited thereto. The catalyst 18 is provided in the midst of the exhaust pipe to remove noxious substances such as CO, HC and NOx in the exhaust gas.

The intake passage 11 is provided with an air flow meter 21, an intake throttle valve 22 and an intake control valve 23 in that order from the upstream side. The air flow meter 21 outputs a signal in accordance with an air quantity flowing therein to an electronic control unit (hereinafter referred to as "ECU") 100. The ECU 100 calculates an air quantity as an estimation value flowing into the cylinder, based upon a detection value of the air flow meter 21. It should be noted that the flowing air quantity may be calculated based upon an intake pressure detected by an intake pressure sensor 41. The intake throttle valve 22 is controllable, which in the present embodiment is an electrically operated type, and an opening of which is controlled by the ECU 100. The intake control valve 23 will be in a detail described later. The intake control valve 23 is thus provided at the upstream side of the intake valve 16 and the intake throttle valve 22 is provided at the upstream side of the intake control valve 23. In addition, the injector 10 is provided at the downstream side of the intake control valve 23.

The piston 24 is received in the cylinder 12 in a reciprocating manner. The piston 24 is connected through a connecting rod 25 to the crank shaft 26.

An electrical structure of such control apparatus of the engine will be described. The ECU 100 is provided with the injector 10, the ignition plug 14, the air flow meter 21, the intake throttle valve 22, and the intake control valve 23 as mentioned above, and besides, a crank angle sensor 28, an oxygen density sensor 29, an accelerator opening sensor 30, a brake switch 31, an intake pressure sensor 41, an intake temperature sensor 42 and a pressure sensor 55 connected thereto. The injector 11 is opened/closed based upon an ON/OFF signal outputted from the ECU 100, thereby executing/stopping fuel injection. The ignition plug 14 discharges spark based upon an ignition signal outputted from the ECU 100. The intake throttle valve 22 is of a butterfly valve type and is provided with a valve body 37 located in the intake passage 11, an electric actuator 38 such as a rotary solenoid for driving the valve body 37, and a sensor 39 for detecting an opening of the valve body 37. The accelerator opening sensor 30 outputs a signal in accordance with an operation amount (depressed amount) of an accelerator pedal by a driver. The crank angle sensor 28 outputs a pulse signal to the ECU 100 at a predetermined angle interval of the crank angle 26. The ECU 100 detects as crank angle based upon the pulse signal and also calculates an engine rotational speed. The oxygen density sensor 29 outputs a signal in accordance with the oxygen density in the exhaust gas to the ECU 100. The brake switch 31 outputs an ON/OFF signal in response to an operation of the brake pedal 44 by a driver to the ECU 100. The brake switch 31 is ON upon operating the brake.

The intake pressure sensor 41 is provided in the intake passage 11 at a location downstream of the intake throttle valve 22 and also upstream of the intake control valve 23 (hereinafter referred to as "intake manifold passage 11*a*") and outputs a signal in accordance with the pressure at the above location (hereinafter referred to as "intake manifold pressure") to the ECU 100. The intake temperature sensor 42 outputs a signal in accordance with a temperature of an intake air to the ECU 100. A pressure sensor 55 is provided in the intake passage at a location downstream of the intake control valve 23 and also upstream of the intake valve 16 (hereinafter referred to as "port passage 11*b*") and outputs a signal in accordance with the pressure at the above location (hereinafter referred to as "port pressure") to the ECU 100. The pressure sensor 55 has a high responsiveness. In the present embodiment, one intake pressure sensor 41 and one intake temperature sensor 42 are provided in the surge tank 48. The pressure sensor 55 is provided for each cylinder, in more detail for each branch pipe 49 of each cylinder.

The intake control valve 23 is provided for each branch pipe 49 of each cylinder at a location upstream of the pressure sensor 55.

The intake control valve 23 is provided with a valve body 33 located in the intake passage 11 (in more detail, branch pipe 49) and an electric actuator 34 such as a rotary solenoid for driving the valve body 33. Further, the intake control valve 23 is provided with an opening sensor 54 for detecting an opening of the valve body 33. It is preferable that the opening sensor 54 is of a non-contact type. The intake control valve 23 can close the intake passage 11 and in particular, is different from the intake throttle valve 22, having such a structure as to air-tightly close the intake passage 11 for blocking passage of the intake air at a fully closed time thereof. In contrast to it, the intake throttle valve 22 throttles the intake passage 11 at a maximum at the fully closed time, but at that time, allows passage of the intake air. In addition, the electric actuator 34 of the intake control valve 23 operates at a higher speed than an electric actuator 38 of the intake throttle valve 22, having a high responsiveness and possibly opens/closes the valve body 33, for example within 2 to 3 msec, or in the order of 10° CA in engine rotation of 2000 rpm as represented by crank angle unit. Thereby, the intake control valve 23 can open/close in synchronization with opening/closing of the intake valve 16. In the present embodiment, the intake control valve 23 is of a butterfly type, but may be of a different type such as a shutter valve.

The intake control valve 23 has an opening which is controlled from a fully opened angle to a fully closed angle in response to an opening signal outputted from the ECU 100 to the electric actuator 34. In addition, in a case where the intake control valve 23 is provided for each cylinder and each cylinder has a plurality of intake passages 11 (branch pipes 49), the intake control valve 23 is provided for each intake passage 11. Such plurality of the intake control valves 23 are individually controlled for each cylinder and for each intake passage 11.

In the present embodiment, the intake control valve 23 is controlled as an individual cylinder unit and the opening thereof is controlled only at a fully opened/closed case. In the present embodiment, "valve opened" or "valve closed" of the intake control valve 23 means "fully opened" or "fully closed" of the intake control valve 23. Further, "fully opened" or "fully closed" does not necessarily mean mechanically fully opened or fully closed, but means the degree of passing-air throttling. For example, in a case of "fully opened", even if the valve is not mechanically fully opened, when reduction of the passing air quantity does not occur, the valve is in a fully opened condition. In addition, in the present embodiment, in a case of "operation" of the intake control valve 23, it means that the intake control valve 23 opens and closes during one cycle and in a case of "non-operation" of the intake control valve 23, it means that the intake control valve 23 is retained to be in a fully opened condition.

Figure 2:
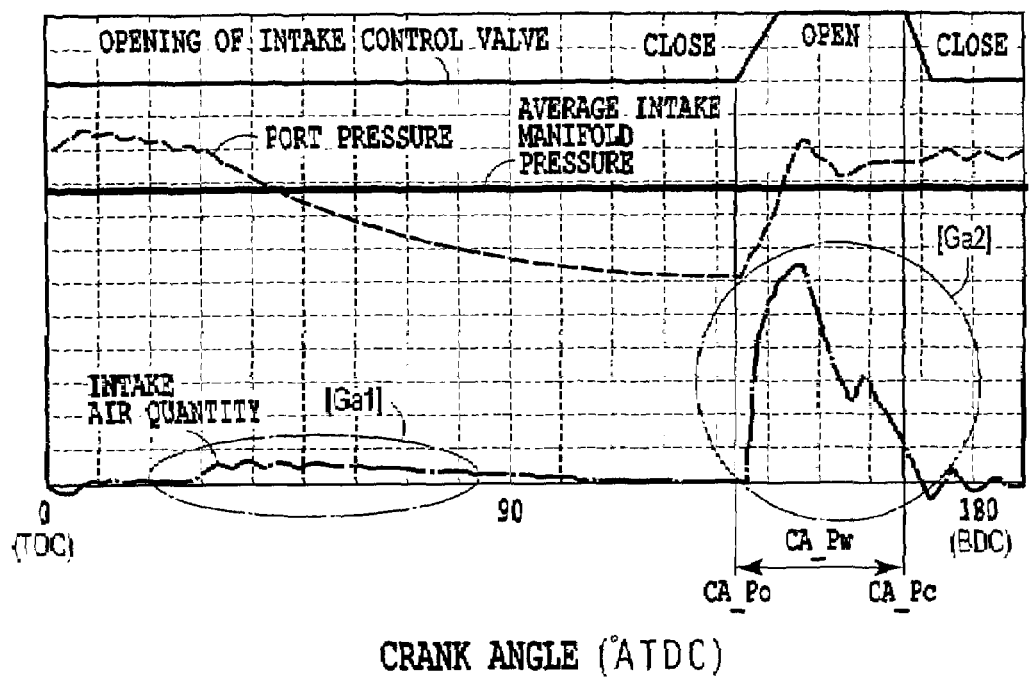
FIG. 2 is a time chart showing a changing state of pressure and air quantity at the time of operating an intake control valve.

The outline of a change in pressure and air quantity during an intake stroke in a case of operating the intake control valve 23 in such a manner as to perform inertia supercharging will be explained with reference to FIG. 2. FIG. 2 shows changes of an opening of the intake control valve 23, a port pressure at the downstream side of the intake control valve 23, an average value of an intake manifold pressure (average intake manifold pressure) at the upstream side of the intake control valve 23, and a flow quantity (g/s) of air flowing into a specific cylinder when the crank angle has advanced. CA_Po, CA_Pc, and CA_P_w each represent opening timing, closing timing and an opening period of the intake control valve 23. The opening timing and the closing timing are represented as timing (target value) when the ECU 100 outputs a valve opening signal and a valve closing signal to the intake control valve 23. These have a relation of CA_Pc=CA_Po+CA_Pw.

As shown in the figure, before the opening of the intake control valve 23, the port pressure gradually reduces as the piston 24 descends. And when the opening timing CA_Po comes and the intake control valve 23 momentarily opens, the air flows into the cylinder at a time due to difference in pressure between the upstream side and the downstream side of the intake control valve 23 formed immediately before the opening timing CA_Po, thus executing inertia supercharging (refer to (Ga 2)). At this point, the port pressure is higher than the average intake manifold pressure. When in this state, the intake control valve 23 and the intake valve 16 are closed, the high pressure is retained in the port passage 11*b*. When the intake valve 16 is opened at the next intake stroke, the air in the port passage 11*b* flows into the cylinder due to the high pressure and occurrence of negative pressure by the descending of the piston 24 (refer to a portion of (Ga 1)). In a case where the overlap exists like the present embodiment, the flowing air scavenges the exhaust gas (remaining gas) which has remained in the cylinder to the exhaust passage 17 and partly sweeps across to the exhaust passage 17. In a case of no occurrence of overlapping, such operation does not occur.

Herein, the intake air quantity based upon the main air inflow performed after the intake control valve 23 is opened at an end period of the intake stroke is defined as Ga 2 and the intake air quantity based upon the air inflow performed before the intake control valve 23 is opened at an initial period of the intake stroke is defined as Ga 1. Hereinafter, Ga 2 and Ga 1 are respectively referred to as "after-valve-opening air quantity" and "before-valve-opening air quantity". The air inflow at the end period is caused by inertia supercharging for an increase of an air quantity as an original object. The air inflow at the initial period is to use the port pressure retained from the previous intake stroke to scavenge the in-cylinder remaining gas into an exhaust system and at the same time, intends to increase an air quantity into the cylinder. Since the flowing amount at this initial period amounts to 20 percent of its entirety, it is also important to accurately estimate it.

With respect to the initial air inflow, the port pressure immediately before the opening of the intake valve 16 is affected by (1) port pressure at the time of closing the intake control valve and the intake valve in the end period of the previous intake stroke, (2) a leakage amount of air for a period from the previous intake stroke to immediately before the opening of the intake valve at this time, (3) the in-cylinder pressure at the opening timing of the intake valve, or the like. With respect to (1) and (2), it is extremely difficult to measure it or estimate a change of it due to ageing and it can not be measured with a usual sensor. With respect to (3), the in-cylinder pressure at the time of opening the intake valve at this time is strongly subject to the influence of exhaust fluctuations during the opening of the exhaust valve. When the overlap exists with the intake valve and the exhaust valve being opened, the influence is further increased. Therefore, the in-cylinder pressure is affected by the combustion state of the other cylinder, and a pressure fluctuation for each cycle is very large, so that even if it is possible to estimate the average value at a steady state, it is difficult to accurately estimate an in-cylinder pressure at each cycle. The present embodiment also proposes one method of being capable of accurately estimating an air quantity flowing at an initial period, which has been difficult to estimate conventionally.

First Aspect of an Engine Control

A first aspect of an engine control in the present embodiment will be hereinafter explained. The first aspect particularly has the feature of setting opening timing and an opening period of the intake control valve 23. It should be noted that each map, which will be described, is in advance prepared through experiments and analyses and is stored in the ECU 100.

Figure 3B:
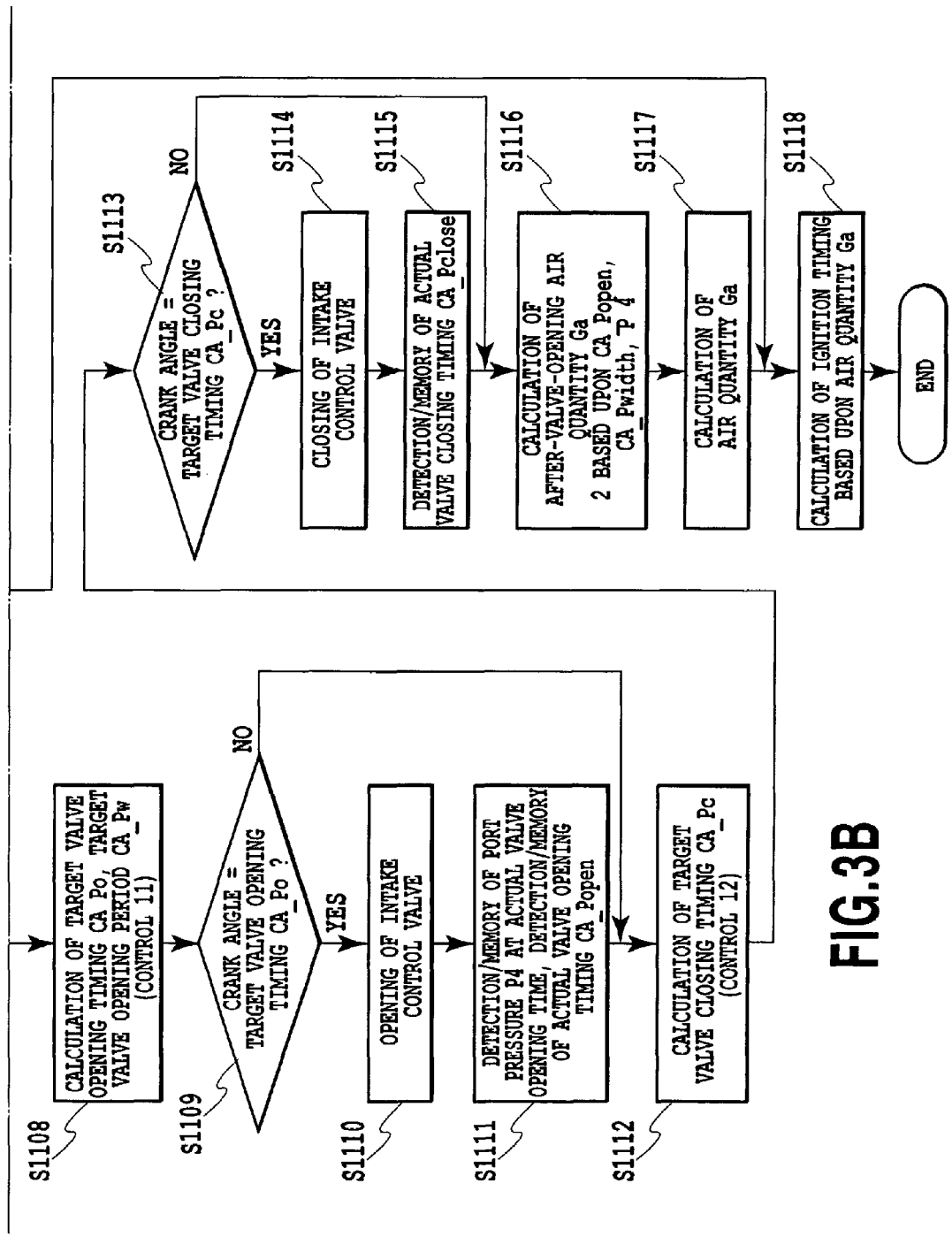

FIGS. 3A and 3B each show a main routine of the first aspect of the engine control. This main routine is executed for each cylinder and for each predetermined crank angle.

Figure 4:
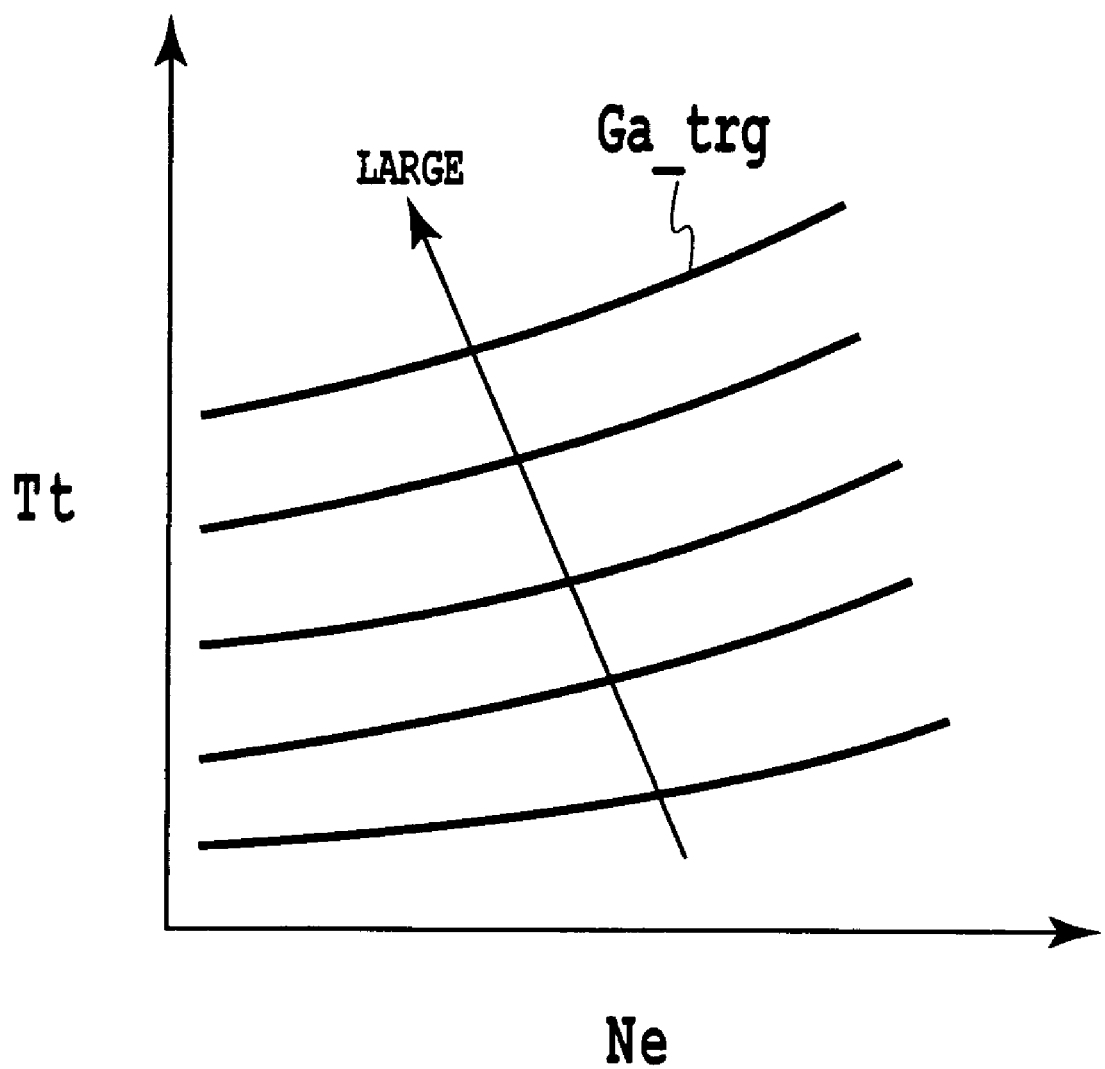
FIG. 4 is a target air quantity map.

First, at step S1101, a target air quantity Ga_trg, which is a target value of an air quantity supplied to one cylinder, is calculated. Herein first, an engine rotational speed Ne and an accelerator opening Ac, which are calculated and detected based upon a signal of the crank angle sensor 28 and a signal of the accelerator opening sensor 30 respectively, are acquired. And torque required for the engine, i.e., a target torque Tt is determined based upon the accelerator opening Ac. Naturally, as the accelerator opening Ac increases, the target torque Tt increases. Next, the target air quantity Ga_trg is calculated with a target air quantity map shown in FIG. 4, based upon the engine rotational speed Ne and the target torque Tt. It should be noted that the target air quantity Ga_trg, the before-valve-opening air quantity Ga 1, the after-valve-opening air quantity Ga 2 and the like are defined as an air quantity (g/cylinder) aspired during one intake stroke per one cylinder of the engine.

Figure 5:
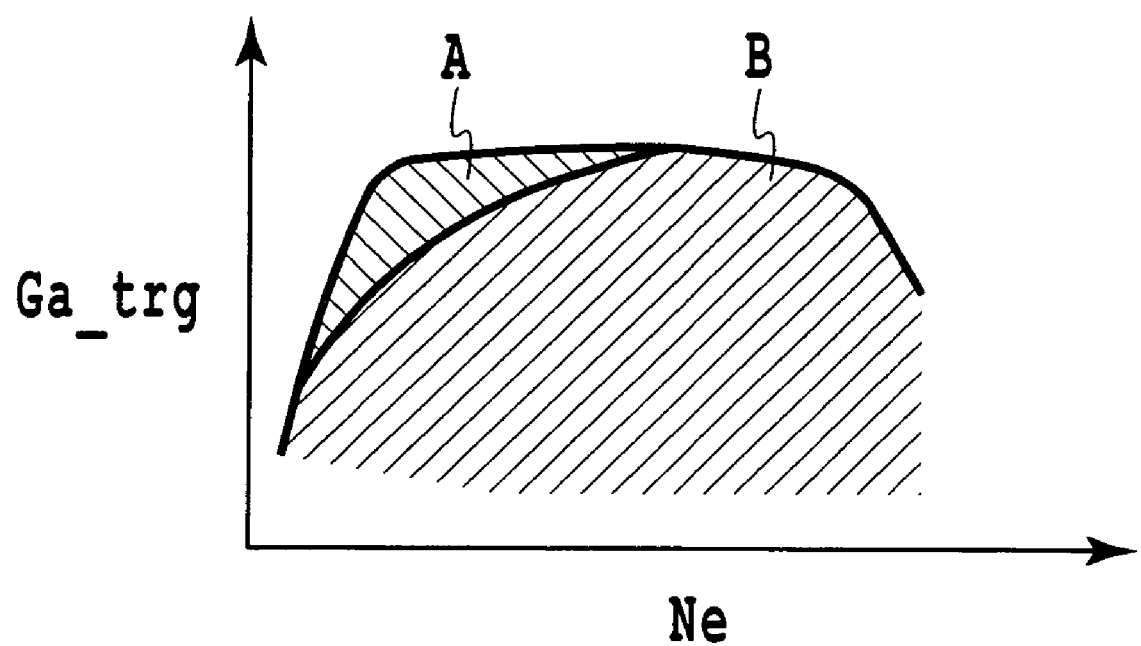
FIG. 5 is a map showing an operational region of the intake control valve.

Next, at step S1102, it is determined based upon the target air quantity Ga_trg and then engine rotational speed Ne which are parameters representative of an engine operating condition whether or not the intake control valve 23 is in an operational region. This determination is made using an operational region map shown in FIG. 5. In this map, the entire region is divided into an operational region A and a non-operational region B. The operational region A exists at a low rotational speed side and an intermediate/high load side of the engine. When the engine operating condition is in an operational region A, the intake control valve 23 is operated, thereby causing an increase of an air quantity. When the engine operating condition is in an operational region B, the intake control valve 23 is prohibited to be operated. The border line between the operational region A and the non-operational region B corresponds to a region where the maximum air quantity is acquired at the non-operational state of the intake control valve.

When the target air quantity Ga_trg and the engine rotational speed Ne are in the operational region A, the process goes to step S1103, wherein an operational flag turns on. On the other hand, when the target air quantity Ga_trg and the engine rotational speed Ne are not in the operational region A (that is, when the target air quantity Ga_trg and the engine rotational speed Ne are in the operational region B), the process goes to step S1104, wherein an operational flag turns off. A determination is thus made as to presence/absence of a demand for an operation of the intake control valve based upon an engine operating condition.

Next, the process goes to step S1105, wherein it is determined whether or not the operational flag is ON. When it is OFF, the process goes to step S1119, wherein the intake control valve 23 is opened. At step S1120, the air quantity Ga flowing into the corresponding cylinder is calculated based upon a detection value of the air flow meter 21 and thereafter, the process goes to step S1118. On the other hand, when it is ON, the process goes to step S1106, wherein the before-valve-opening air quantity Ga 1 is estimated. The estimation of the before-valve-opening air quantity Ga 1 will be explained later. It should be noted that since this main routine is executed in order for each cylinder, at the start time and end time of operating the intake control valve 23 an air quantity estimation (steps S1106 to S1117) is executed on condition that a part of cylinders is in an operational state and an air quantity estimation (step S1120) is executed on condition that the rest of the cylinders is in a non-operational state.

After step S1106, the process goes to step S1107, wherein a target value (target after-valve-opening air quantity) Ga 2_trg of the after-valve-opening air quantity is calculated according to the expression: Ga 2_trg=Ga_trg−Ga 1.

Next, the process goes to step S1108, wherein the control 11 to be described later is executed, thereby calculating a target value (target valve opening timing) CA_Po of an opening timing of the intake control valve 23 and a target value (target valve opening period) CA_Pw of a valve opening period thereof respectively.

Next, at step S1109, it is determined whether or not an actual crank angle detected by the crank angle sensor 28 is target valve opening timing CA_Po.

When the crank angle is the target valve opening timing CA_Po, at step S1110 the intake control valve 23 is opened. That is, the ECU 100 outputs a valve opening signal to the intake control valve 23. And at step S1111, an actual valve timing period (actual valve opening timing) CA_Popen of the intake control valve 23 is detected and is temporarily stored in the ECU 100. At the same time a port pressure in the actual valve opening timing CA_Popen is detected by the pressure sensor 55 and is temporarily stored as P4 in the memory of ECU 100. The process thus goes to step S1112. On the other hand, it is determined at step S1109 that the crank angle is not the target valve opening timing CA_Po, steps S1110 and S1111 are skipped and the process goes to step S1112.

At step S1112, control 12 to be described later is executed, calculating a target value CA_Pc (target valve closing timing) of the closing timing of the intake control valve 23.

Next, at step S1113 it is determined whether or not an actual crank angle detected by the crank angle sensor 28 is the target valve closing timing CA_Pc.

When the crank angle is the target valve closing timing CA_Pc, at step S1114 the intake control valve 23 is closed. That is, the ECU 100 outputs a valve closing signal to the intake control valve 23. Further, at step S1115, an actual valve closing timing (actual valve closing timing) CA_Pclose of the intake control valve 23 is detected and is temporarily stored in the memory of the ECU 100. The process thus goes to step S1116. On the other hand, it is determined at step S1113 that the crank angle is not the target valve closing timing CA_Pc, steps S1114 and S1115 are skipped and the process goes to step S1116.

At step S1116, an actual valve opening period CA_Pwidth is calculated with the expression: CA_Pwidth=CA_Pclose−CA_Popen and also the after-valve-opening air quantity Ga 2 is calculated based upon the actual valve opening timing CA_Popen, the actual valve opening period CA_Pwidth and the port pressure P4 in the actual valve opening timing CA_Popen, which will be described later.

When the before-valve-opening air quantity Ga 1 and the after-valve-opening air quantity Ga 2 are thus determined, the process goes to step S1117, wherein an air quantity as an actual value and also an estimation value is calculated according to the expression: Ga=Ga 1+Ga 2.

Figure 6:
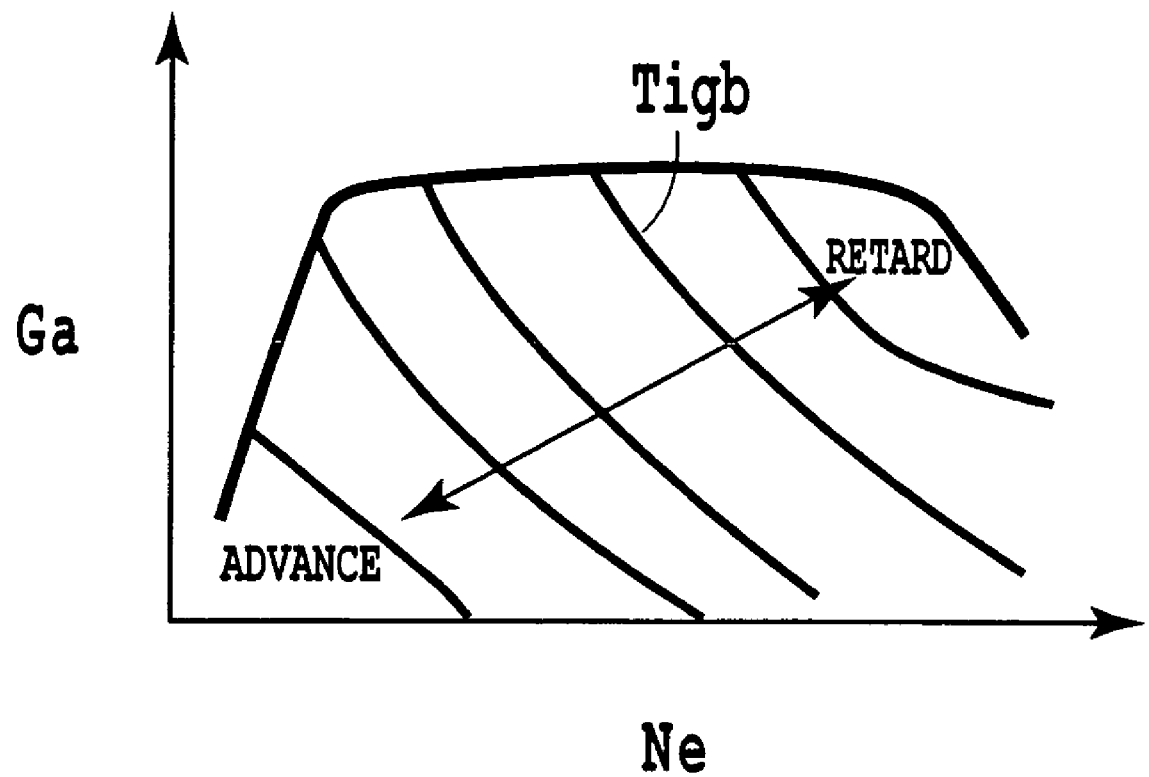
FIG. 6 is an ignition timing map.

Next, at step S1118 an ignition timing Tigb is determined based upon the air quantity Ga with reference to an ignition timing map in FIG. 6. Then, the present routine ends. Herein only the ignition timing is explained as an example of a control amount, but with the similar method, other control amounts such as a fuel injection quantity and fuel injection timing may be determined. The ECU 100 controls the ignition plug 14 and the injector 10 for each cylinder based upon these control amounts.

Next, a detail of such main routine will be hereinafter explained.

First, estimation of the before-valve-opening air quantity Ga 1 at step S1106 will be explained. The before-valve-opening air Ga 1 can be estimated by a change of a port pressure at timing before and after the opening of the intake valve. Herein for simplification, assuming that there is no overlap, an air quantity flowing into the cylinder from the port passage 11b before the opening of the intake control valve is equal to an air quantity reduced from the port passage 11b. The volume of the port passage 11b is geometrically defined and a known constant value.

Therefore, the before-valve-opening air quantity Ga 1 can be estimated by a change of air density in the port passage 11b from immediately before the opening of the intake valve 16 to immediately before the opening of the intake control valve 23.

Figure 7:
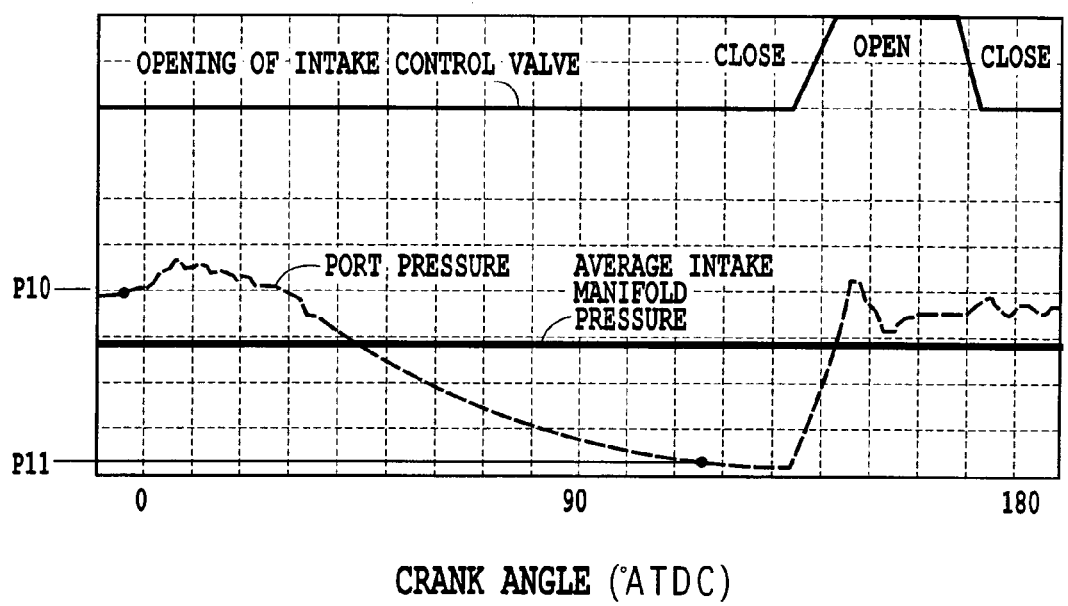
FIG. 7 is a supplementary time chart with respect to estimation of a before-valve-opening air quantity.

Reduction of the port pressure occurring when the air flows from the port passage 11b into the cylinder can be assumed as an adiabatic change. The change of the density is determined according to the next expression by detecting the pressure P10 before the opening of the intake valve and also the pressure P11 after the opening of the intake valve and before the opening of the intake control valve (refer to FIG. 7) by the pressure sensor 55.

$$\rho 11/\rho 10 = (P10/P11)^{\wedge}(-1/k) \tag{1}$$

Herein, ρ10 and ρ11 respectively are air density at the time of detecting P10 and P11. Each of them is referred to as density before the opening of the intake valve and density before the opening of the intake control valve. "k" is a predetermined constant.

It should be noted that a sign "^" denotes power and the right side: (P10/P11)^(−1/k) denotes (−1/k) power of (P10/P11) (hereinafter the same).

Accordingly, the before-valve-opening air quantity Ga 1 flowing into the cylinder is calculated by the next expression.

$$Ga1 = V \times (\rho10 - \rho11) = V \times \rho10 \times (1 - (P10/P11)^{(-1/k)}) \quad (2)$$

Herein, V denotes a volume of the port passage 11b.

The density before the opening of the intake valve ρ10 can be calculated by an intake air temperature and an intake manifold pressure. In the present embodiment, values detected by an intake temperature sensor 42 and an intake pressure sensor 41 are used as the intake air temperature and the intake manifold pressure.

As a result, the before-valve-opening air quantity Ga 1 can be calculated from an intake air temperature, an intake pressure, the pressure P10 before the opening of the intake valve and the pressure P11 before the opening of the intake control valve according to the expression (2). In the present embodiment, the ECU 100 performs such calculation to calculate the before-valve-opening air quantity Ga 1.

Figure 8:
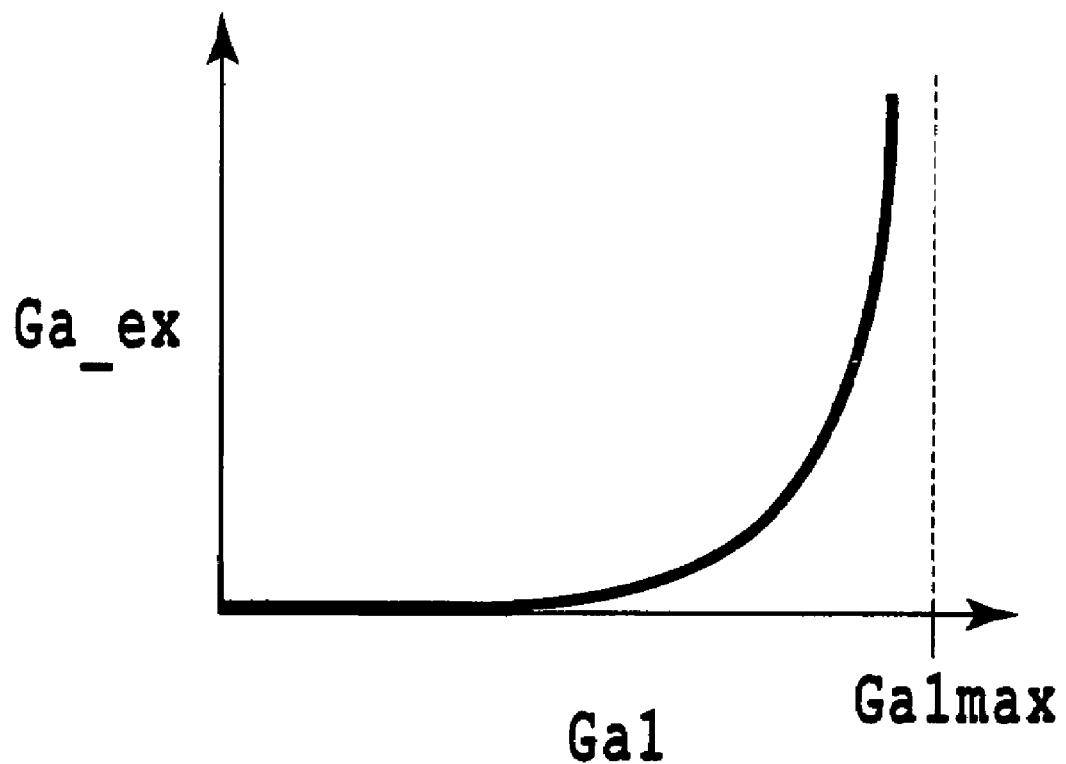
FIG. 8 is a blow-through amount map.

In the present embodiment, because of the overlap, a correction is made in consideration of blow-through of an intake air into an exhaust system during overlapping. That is, a blow-through amount Ga_ex is calculated based upon the before-valve-opening air quantity Ga 1 by using a blow-through map in FIG. 8 and then, is subtracted from the before-valve-opening air quantity Ga 1 to calculate a before-valve-opening air quantity Ga 1 after the correction (Ga 1=Ga 1−Ga_ex). In the map, Ga 1 max is the maximum value of the before-valve-opening air quantity based upon a cylinder volume during the overlapping (this can be assumed to be substantially a top dead center during an intake stroke). In a case of no overlap, since the blow-through of the intake air does not occur, such correction is eliminated.

Next, the control 11 will be explained with reference to FIG. 9 for calculating target valve opening timing CA_Po and a target valve opening period CA_Pw. Please refer to each timing related to the control 11 shown in FIG. 10.

First, at step S1201 it is determined whether or not an actual crank angle detected by the crank angle sensor 28 is first pressure detection timing CA_1. The first pressure timing CA_1 is defined to be timing after the opening of the intake valve and also after the closing of the exhaust valve, for example, 40° ATDC.

When the crank angle is the first pressure detection timing CA_1, the port pressure at the timing CA_1 is detected by the pressure sensor 55 at step S1202 and is temporarily stored as P1 in the memory of the ECU 100. Then, the process goes to step S1203. On the other hand, when it is determined that the crank angle is not the first pressure detection timing CA_1, the step S1202 is skipped and the process goes to step S1203.

Figure 11:
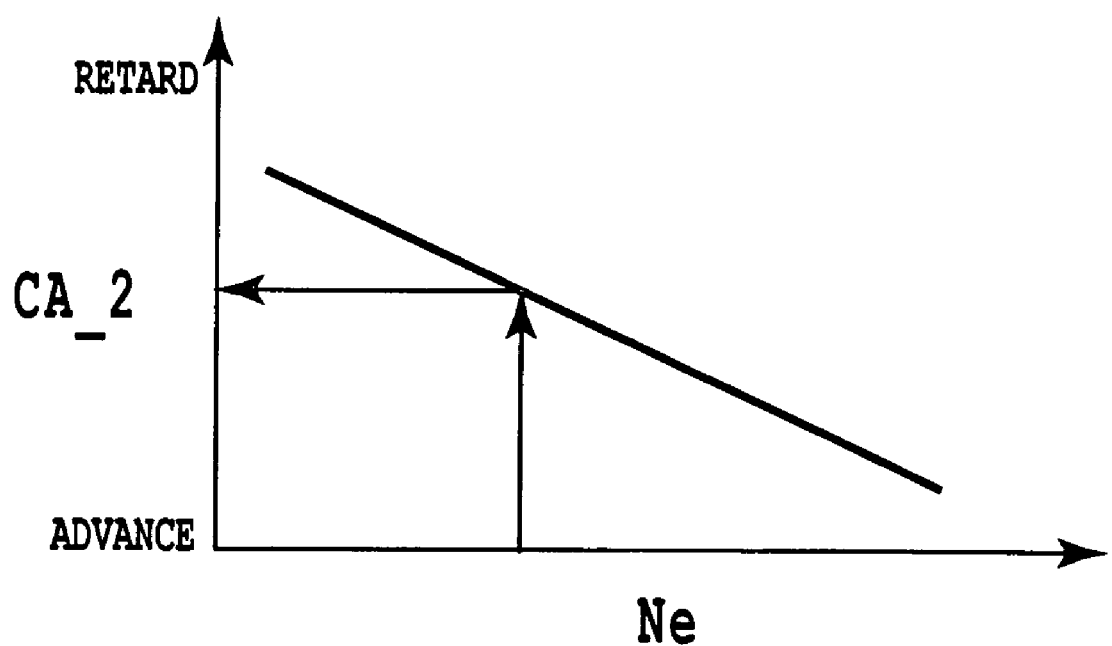
FIG. 11 is a map for second pressure detecting timing.

Next, at step S1203, a second pressure detection timing CA_2 is calculated based upon an engine rotational speed Ne with reference to a second pressure detection map in FIG. 11.

Next, at step S1204 it is determined whether or not an actual crank angle detected by the crank angle sensor 28 is second pressure detection timing CA_2.

When the crank angle is the second pressure detection timing CA_2, the port pressure at the timing CA_2 is detected by the pressure sensor 55 at step S1205 and is temporarily stored as P2 in the memory of the ECU 100. Then, the process goes to step S1206. On the other hand, when it is determined that the crank angle is not the second pressure detection timing CA_2, the step S1205 is skipped and the process goes to step S1206.

At step S1206, a port pressure P3 after final second pressure detection timing CA_2 is estimated based upon the port pressures P1 and P2. This respect will be in detail described later.

And, next at step S1207, target valve opening timing CA_Po and a target valve opening period CA_Pw are calculated based upon the target after-valve-opening air quantity GA 2_trg determined at step S1107 in FIGS. 3A and 3B and the port pressure P3. Then, the present routine ends.

Generally, the control 11 executes the processes in which port pressures at two points before the opening of the intake control valve are detected, the port pressure P3 after the final detection timing is estimated, and the target valve opening timing CA_Po and the target valve opening period CA_Pw are calculated based upon the estimated port pressure P3 and the target after-valve-opening air quantity GA 2_trg.

Since a change of the cylinder volume after the closing of the exhaust valve can be assumed as adiabatic change, when the port pressures at the two points are detected, the port pressure thereafter can be estimated. The reason for defining the first pressure detection timing CA_1 as timing after the opening of the intake valve at step S1201 is that the time is required for the pressure in the port passage 11b to become substantially equal to the in-cylinder pressure. The reason for defining the first pressure detection timing CA_1 as timing after the closing of the exhaust valve at step S1201 is that when the port passage 11b or the cylinder 12 is communicated with the exhaust passage 17, the port pressure varies subject to the influence of the exhaust pressure.

In regard to step S1203, in a map in FIG. 11, as the engine rotational speed Ne increase, the second pressure detection timing CA_2 is advanced. This is because as the engine rotational speed Ne increases, the opening timing of the intake control valve is advanced.

In regard to step S1206, the estimation of the port pressure P3 is made by the following method.

First, "k" is calculated by the expression of an adiabatic change: $P2/P1=(V1/V2)^k$. Herein, V1 is a sum of the port passage 11b and the in-cylinder volume at the first pressure detection timing CA_1, and V2 is a sum of the port passage 11b and the in-cylinder volume at the second pressure detection timing CA_2. Since the in-cylinder volume is a function of a crank angle and each timing CA_1 and CA_2 is obtained, it is possible to calculate the respective in-cylinder volumes.

Next, P3 is calculated according to the expression "$P3=p2(V2/V3)^k$. V2 is a sum of the port passage 11b and the in-cylinder volume at the timing desiring to calculate P3.

Thereby, the port pressure P3 at each crank angle after the second pressure detection timing CA_2 can be estimated. If "k" is a constant in advance obtained with experiments or the like, the port pressure P3 can be estimated by detecting either one of the port pressures P1 and P2. For example, the port pressure P3 can be estimated based upon only the port pressure P1 according to the expression "$P3=P1(V1/V3)^k$.

Next, calculation of the target valve opening timing CA_Po and the target valve opening period CA_Pw at step S1207 will be explained.

Figure 12:
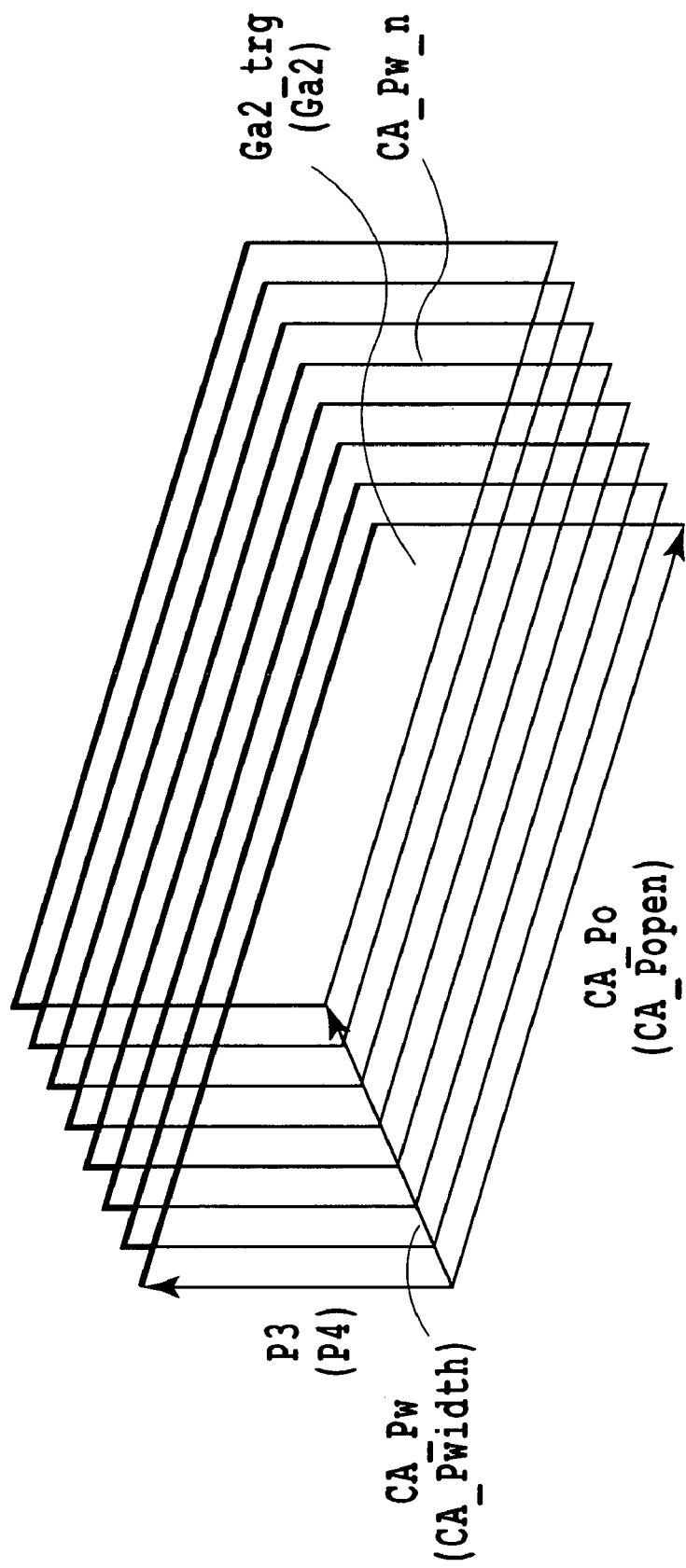
FIG. 12 is a map for an after-valve-opening air quantity.
Figure 13:
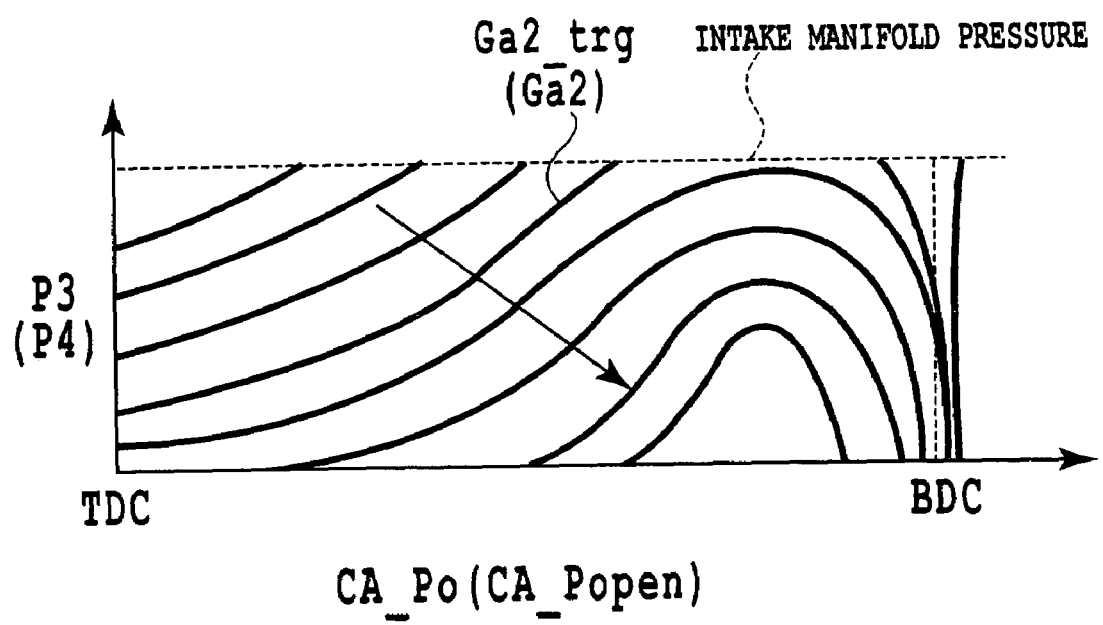
FIG. 13 is a map for an after-valve-opening air quantity for a certain constant valve opening period.

Herein, an after-valve-opening air quantity map shown in FIG. 12 is used. The after-valve-opening air quantity map is a three-dimensional map drafted in such a manner as to calculate the target after-valve-opening air quantity amount Ga 2_trg from three parameters composed of the port pressure P3, the target valve opening timing CA_Po and the target valve opening period CA_Pw. For example, the map in FIG. 13 is obtained by extracting a map at a certain valve opening period CA_Pw_n. TDC is a top dead center during an intake stroke and BDC is a bottom dead center during an intake stroke. This map, which will be explained later, is also used for calculating the after-valve-opening air quantity Ga 2 from a port pressure P4 as an actual value, valve opening timing CA Popen and a valve opening period CA_Pwidth. As seen, as the valve opening timing is retarded, the air quantity increases and reaches the peak at some region. Then it reduces as the valve opening timing is retarded away from that region. This is because the period from the opening of the intake control valve 23 to the closing of the intake valve 16 is shortened. The contents of maps shown in FIGS. 12 and 13 are the ones when the engine rotational speed is a certain constant value.

The inventors, as a result of serious studies, have found out that there is a mutual relationship between the aforementioned three parameters (that is, the port pressure at the valve opening, the valve opening timing and the valve opening period) and the air quantity flowing into the cylinder when the intake control valve 23 is opened. In particular, the air quantity after the opening of the intake control valve 23 depends largely on the opening timing of the intake control valve 23 and the port pressure at that point. The corresponding after-valve-opening air quantity map is drafted by repeating the processes such as experiments and analyses based upon such findings. In general, when the intake air quantity is designed to be increased, it is effective to reduce the port pressure P 2 at the valve opening timing (a pressure difference between the upstream side and the downstream side of the intake control valve increases, thereby speeding up the intake flow speed at the valve opening timing), retard the valve opening timing (the same reason and the air is pressed into the cylinder when the in-cylinder volume is large) or lengthen the valve opening period (the air inflow time is lengthened). However, the valve opening timing, as seen from that the peak of the air quantity exists in the map, has the optimal timing based upon a relation between the port pressure at the valve opening timing, the in-cylinder volume, the valve opening period after the valve opening (or the closing timing of the intake valve) and the like.

Using this map allows the after-valve-opening air quantity to be estimated from the three parameters. However, in a case of the present embodiment, the valve opening timing and the valve opening period are calculated by using the map when the port pressure at the valve opening timing and the after-valve-opening air quantity are known.

Figure 14:
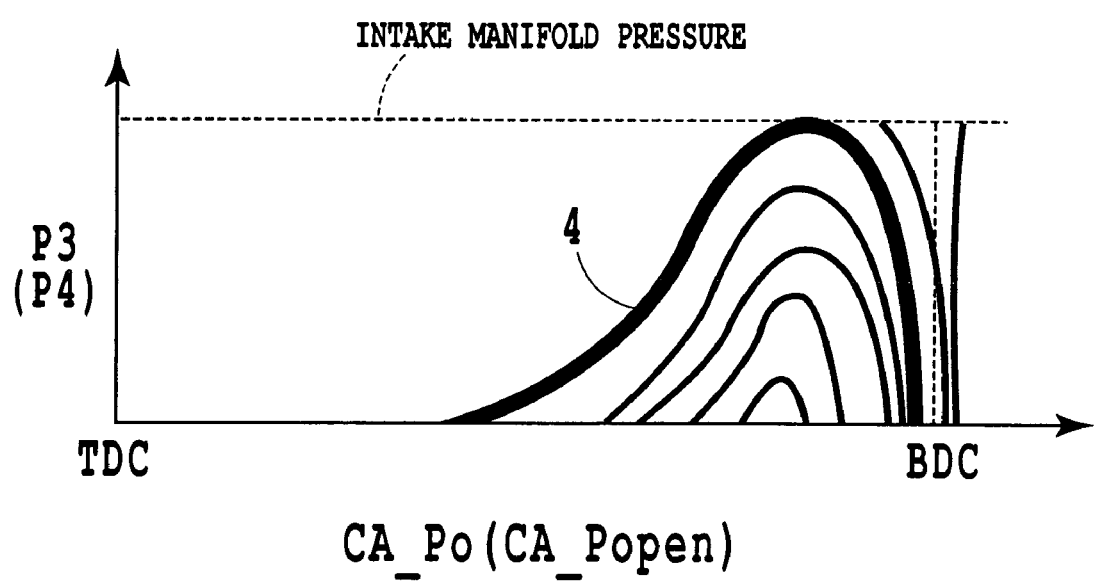
FIG. 14 is a map for an after-valve-opening maximum air quantity.

There is executed the operation or the processing of drafting the after-valve-opening air quantity map into a two-dimensional map (called as the maximum after-valve-opening air quantity map) shown in FIG. 14 by using the maximum value of the target after-valve-opening air quantity Ga 2_trg at each target valve-opening period CA_Pw in the after-valve-opening air quantity in FIG. 12. In an easier explanation, first assuming that the three-dimensional map in FIG. 12 is composed of a plurality of two-dimensional maps for each target valve opening period CA_Pw as shown in the figure, each map is transparently viewed in the axial direction (arrow direction) of the target valve opening period CA_Pw. Roughly saying, the transparent view is an image where a plane defined by both axes of the target valve opening timing CA_Po and the port pressure P3 is skewered at countless points in the arrow direction. In addition, by extracting and plotting the points where the target after-valve-opening air quantity Ga 2_trg is the maximum to each target valve opening timing CA_Po and each port pressure P3 from the plurality of the maps, the two-dimensional map shown in FIG. 14 is obtained. Such operation or processing is executed by the internal processing of the ECU 100 in the present embodiment, but the two-dimensional map may be in advance composed" for being stored in the ECU 100. In this two-dimensional map, an inside of an equal air quantity curve 4 (heavy line) the top of which is overlapped with the intake manifold pressure is a region where an air quantity can increase more than in a case of absence of the intake control valve 23 and the left side of the curve 4 (the side where the valve opening timing is advanced) is a region where there is provided just an air quantity equal to that in a case of absence of the intake control valve 23 and the right side of the curve 4 (the side where the valve opening timing is retarded) is a region where only a smaller air quantity is obtained than in a case of absence of the intake control valve 23.

Figure 9:
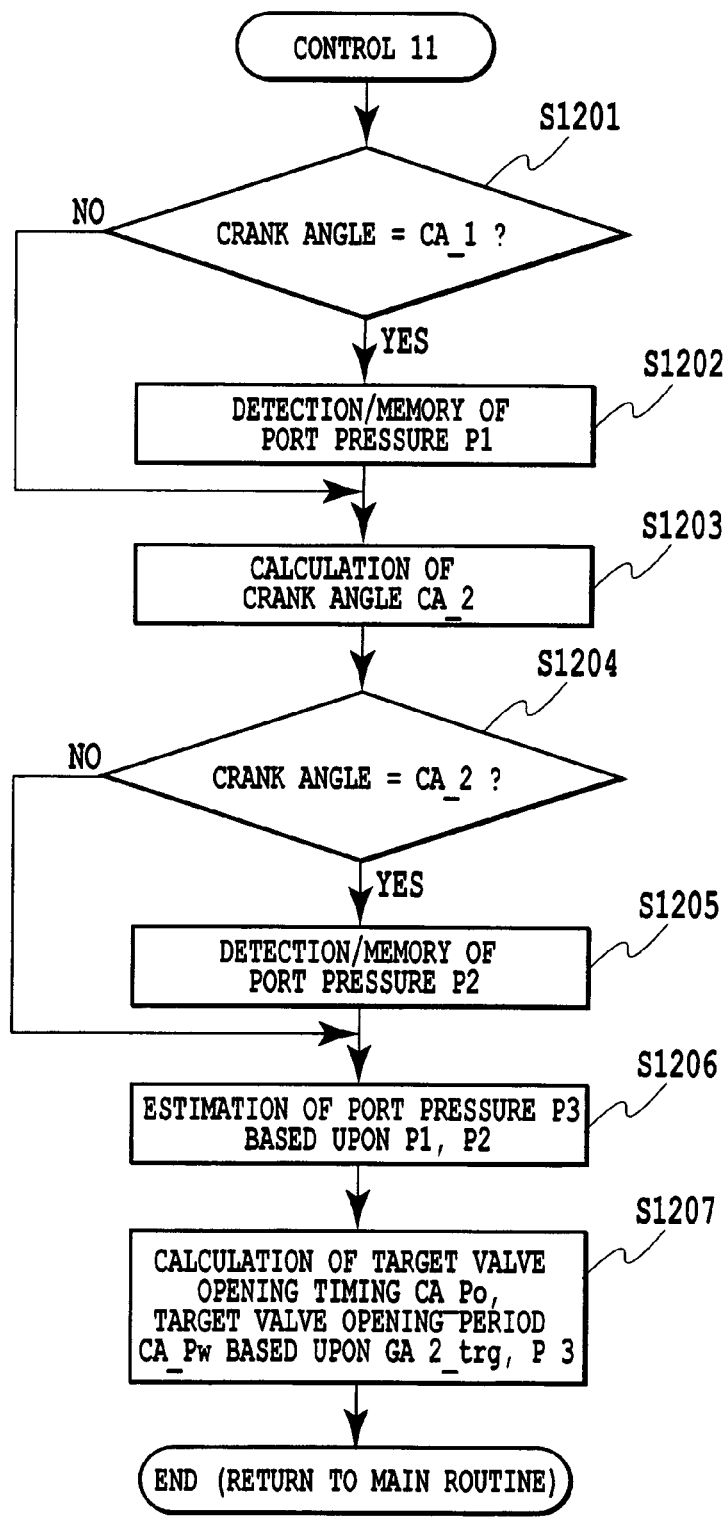
FIG. 9 is a flow chart of a routine for control 11.
Figure 10:
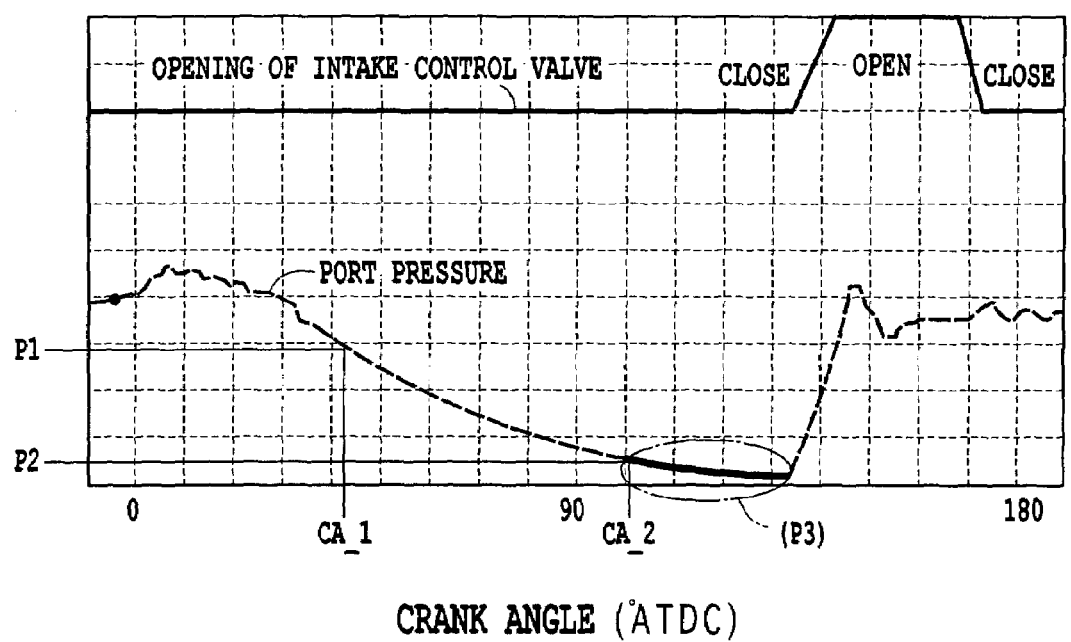
FIG. 10 is a supplementary time chart with respect to the control 11.
Figure 15:
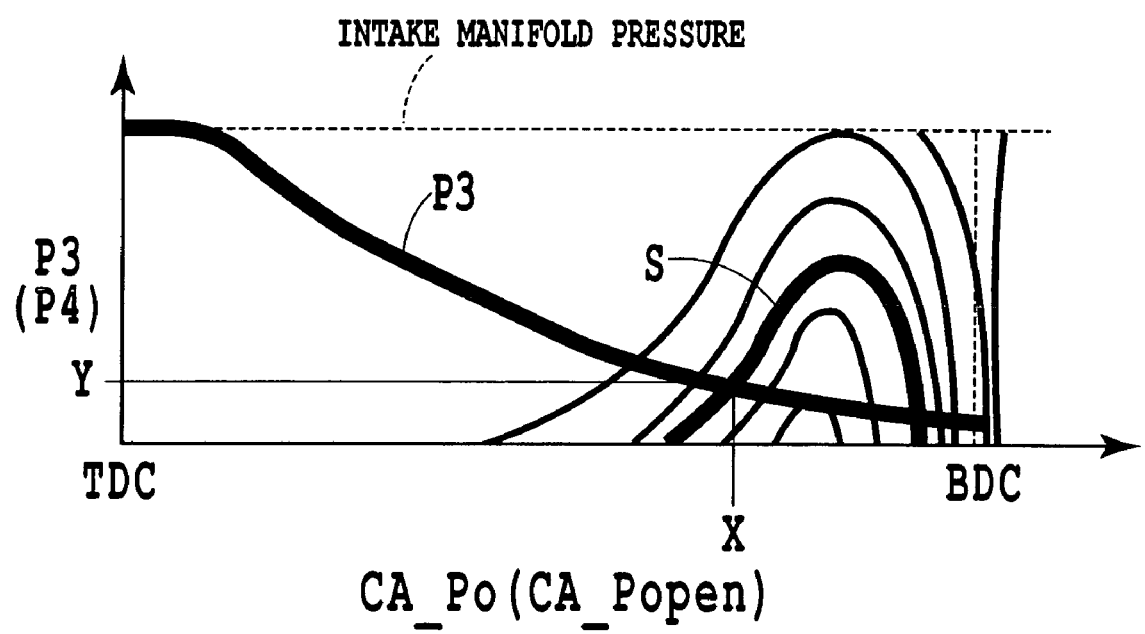
FIG. 15 is a graph for explaining a determining method of target valve-opening timing and a port pressure at the target valve-opening timing.

There is executed the processing where the port pressure P3 as the estimation value obtained at step S1206 in FIG. 9 is overlapped to the two-dimensional map drafted in this way, as shown in FIG. 15. In the figure, for convenience, port pressures at points before the second pressure detection timing CA_2 are also shown. In addition, a cross point between the curve of the port pressure P3 thus changing in the reducing direction with advance of the crank angle and the equal air quantity curve (heavy line) having a value of the target after-valve-opening air quantity (Ga 2_trg=S) is determined. A crank angle corresponding to the most advanced point among them is determined as the target valve opening timing to be obtained (CA_Po=X). The port pressure P3 corresponding to the one point is determined as a port pressure to be obtained (P3=Y).

When the target valve opening timing (CA_Po=X) and the port pressure (P3=Y) are solely determined, next, one of the maps where they are obtained is extracted. That is, the three-dimensional map in FIG. 12 is assumed to be composed of a plurality of maps for each target valve opening period CA_Pw, but one map is supposed to exist corresponding to the target valve opening timing CA_Po=X, the port pressure P3=Y and the target after-valve-opening air quantity GA2_trg=S. Therefore, the one map is extracted from the three-dimensional map in FIG. 12 and the target valve opening timing CA_Po=X, the port pressure P3=Y and the target after-valve-opening air quantity GA 2_trg=S are put into the one map to determine a target valve opening period to be obtained CA_Pw=Z.

The processing as described above is executed at the ECU 100 to calculate the target valve opening timing CA_Po and the target valve opening period CA_pw at step S1207 in FIG. 9.

Figure 16:
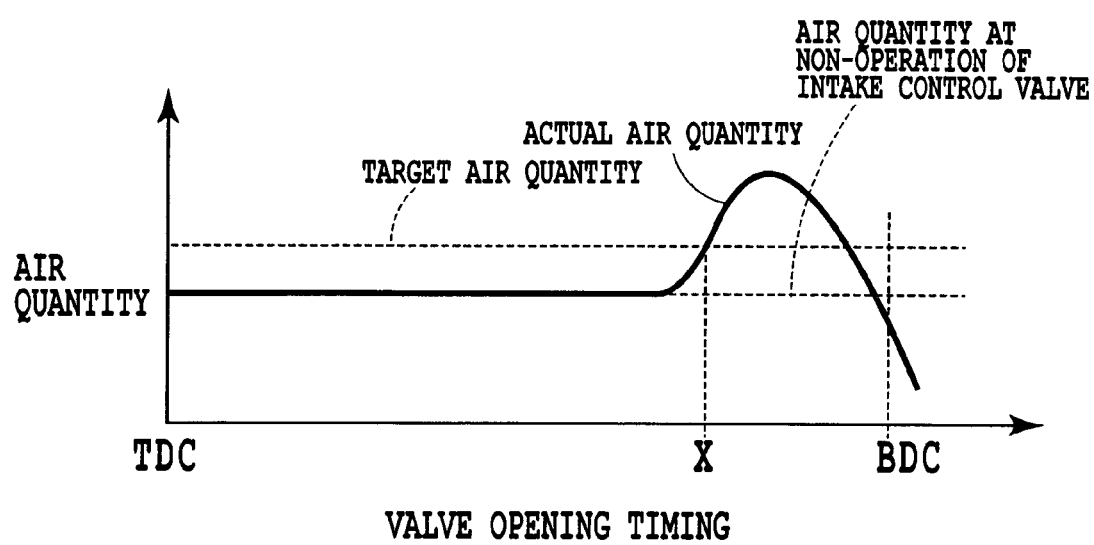
FIG. 16 is a graph showing a relation between valve opening timing and an air quantity.

Herein, the valve opening timing X and the valve opening period Z will be explained with reference to FIGS. 16 and 17. FIG. 16 is a graph showing how much an air quantity can be obtained by changing the valve opening. It should be noted that it is presupposed that the valve opening timing is the optimal one. When the valve opening timing is X, an actual air quantity is equal to a target air quantity. Thereby, as the valve opening timing is advanced, the actual air quantity is smaller than the target air quantity and becomes equal to the air quantity at the non-operating time of the intake control valve in many regions. This is because in a case where the valve opening timing is advanced too much, the in-cylinder volume at the valve opening time is small, and the pressure difference between the upstream side and the downstream side of the intake control valve is small. This region corresponds to the left side region of the curve 4 in FIG. 14. In addition, as the valve opening timing is retarded from X, the actual air quantity gradually increases, and thereafter, reduces and finally is smaller than the target air quantity. Such mountain part is a part where a supercharging effect is acquired by the intake control valve 23, that is, a part corresponding to a region inside the curve 4 in FIG. 14. And a region where the actual air quantity is less than the air quantity at the non-operating time of the intake control valve corresponds to the right side region of the curve 4 in FIG. 14. The reason the actual air quantity is less than the air quantity at the non-operating time of the intake control valve is that simply the period from the opening of the intake control valve 23 to the closing of the intake valve 16 is shortened, thereby being incapable of securing a sufficient air inflow time.

Figure 17:
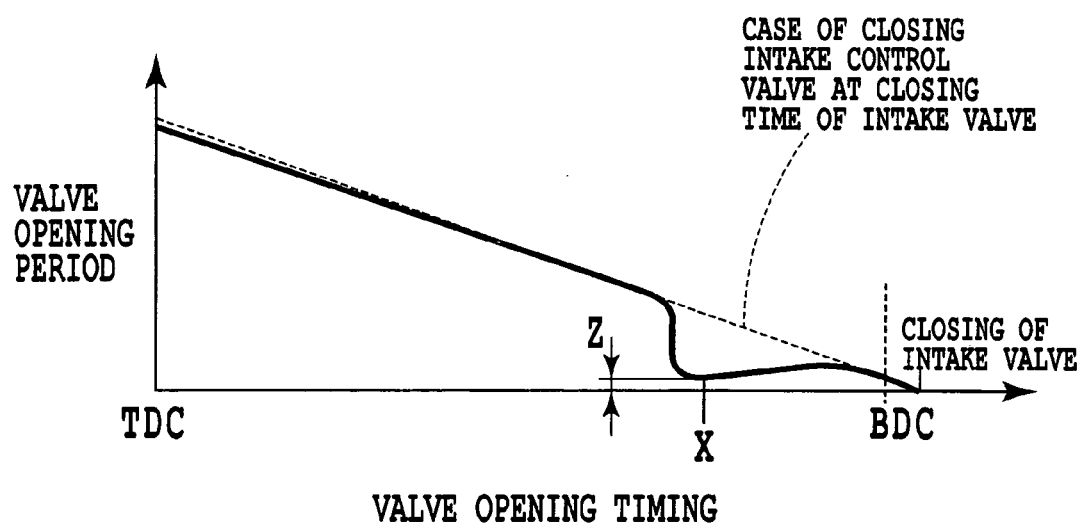
FIG. 17 is a graph showing a relation between valve opening timing and a valve opening period.

FIG. 17 shows a state of a change in valve opening period when the valve opening timing is changed. Herein, there is shown a relation between the valve opening timing and the valve opening period when the maximum air quantity is adapted to be acquired. Like a broken line, when the intake control valve is closed at the same time when the intake valve is closed, a relation of the valve opening period to the valve opening timing is inversely proportional and the valve opening period becomes zero at the closing time of the intake valve. In contrast to it, in a case of the present embodiment shown in a solid line, when the valve opening timing is X or timing after X, the valve opening period Z is shorter than the broken line and the intake control valve is closed earlier than the intake valve. The reason for it is to seal the air in the cylinder, which has once flown into the cylinder and has been in a supercharging state to prevent the backflow and the pressure leakage.

Figure 18:
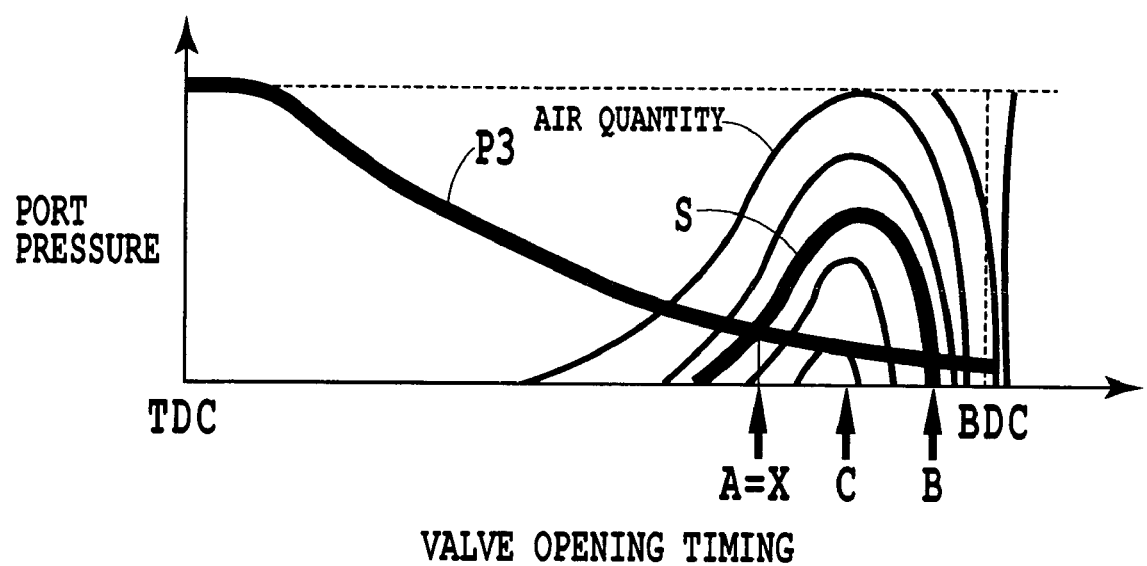
FIG. 18 is a graph for explaining a setting method for valve opening timing.

FIG. 18 is similar to FIG. 15 and shows a relation between valve opening timing, a port pressure and an air quantity. In a case of desiring to obtain such target air quantity S, the valve opening timing may be either one of two cross points A and B between the target air quantity S and the port pressure P3. However, in the present embodiment, the most advanced timing (A=X) is adopted. The reason for it is that as the intake control valve is opened as early as possible, the pumping loss reduces to lower a temperature rise in the cylinder, and when the valve opening timing is thus selected as the end side, a change of the air quantity to variations of the valve closing timing is reduced.

Figure 19:
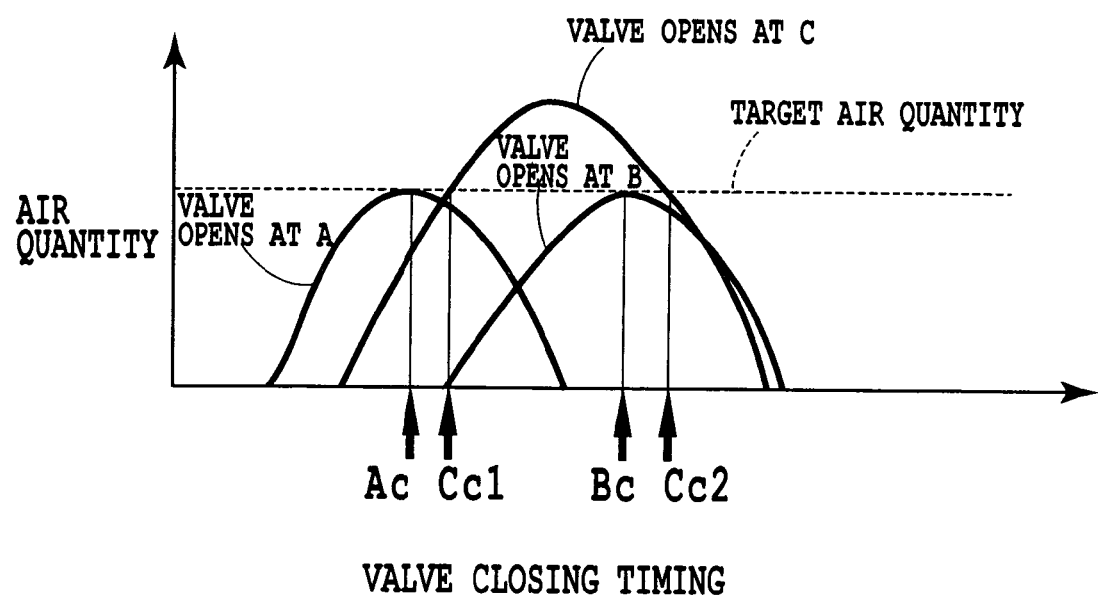
FIG. 19 is a graph for explaining a setting method for valve opening timing.

Next, the third reason will be explained. FIG. 19 shows a relation between valve closing timing and an air quantity. Three mountains in the figure are curves upon changing valve closing timing in a case where the valve opening timing of each mountain is A, B or C. In a case of each of the most advanced valve opening timing A and the most retarded valve opening timing B, the target air quantity S is obtained in the peak of each mountain and a change of the air quantity is small even if the valve closing timing deviates. On the other hand, in a case of the intermediate valve opening timing C, the valve closing timing, where the target air quantity S is obtained, Cc 1 or Cc 2. Since each of Cc 1 and Cc 2 is positioned in an intermediate point of the mountain slope, a change of the air quantity becomes large when the valve closing timing deviates. This is the reason the intermediate valve opening timing C is not adopted and the valve opening timing A positioned at the end side is adopted.

Next, detections of the actual valve opening timing CA_Popen and the actual valve closing timing CA_Pclose at steps S111 and S1115 will be explained.

Figure 20:
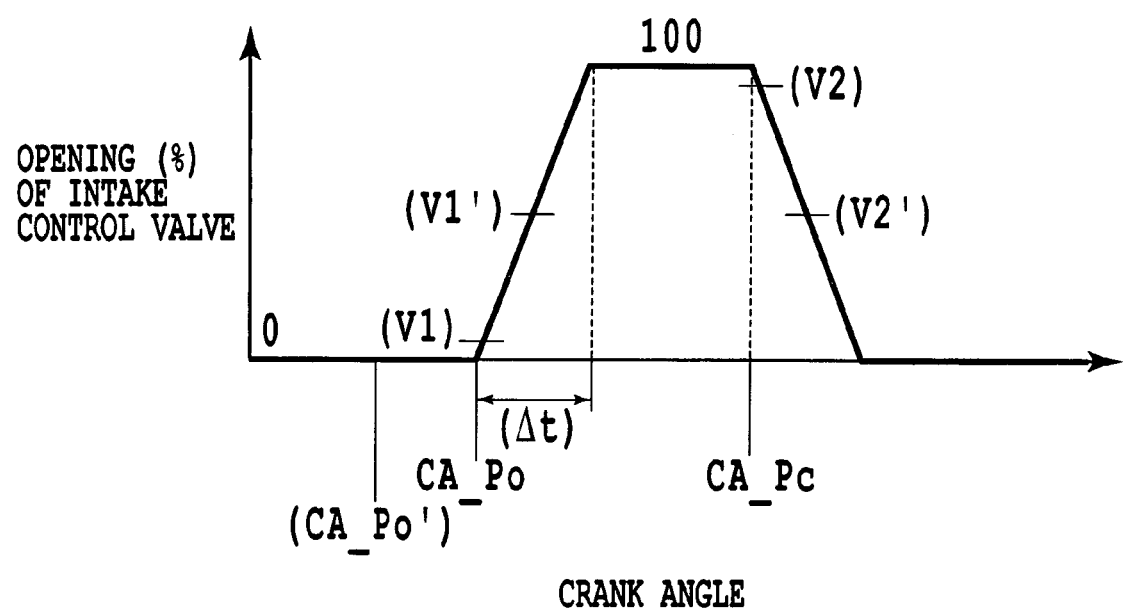
FIG. 20 is a graph showing a change in an opening of an intake control valve at the time of opening/closing the intake control valve.

FIG. 20 shows an opening change of the intake control valve 23 at the opening/closing operating time of the intake control valve 23. When an actual crank angle reaches target valve opening timing CA_Po, at the same time the ECU 100 sends a valve opening signal to the intake control valve 23, thereby operating an electric actuator 34 of the intake control valve 23 to the valve opening side, so that the intake control valve 23 is fully opened (valve opening: 100%). Thereafter, when the actual crank angle reaches target valve closing timing CA_Pc, at the same time the ECU 100 sends a valve closing signal to the intake control valve 23, thereby operating an electric actuator 34 of the intake control valve 23 to the valve closing side, so that the intake control valve 23 is fully closed (valve opening: 0%).

At the valve opening/closing time, a time lag occurs between when a valve opening signal or a valve closing signal is sent and when the intake control valve 23 actually moves. Therefore, in consideration of the time lag, an actual change in an opening of the intake control valve 23 is detected by the opening sensor 54 of the intake control valve 23 and the timing of the detection is defined respectively as actual valve opening timing CA_Popen and actual valve closing timing CA_Pclose. For this detection, a crank angle sensor 28 is used.

More specially, when a detection value of the valve opening sensor 54 of the intake control valve 23 exceeds a predetermined value V1 which is in a side slightly opener than a value equivalent to the valve opening zero %, that is, when the intake control valve 23 starts to open, the ECU 100 determines actual valve opening of the intake control valve 23 and stores the then crank angle as the actual valve opening timing CA_Popen. On the other hand, when a detection value of the valve opening sensor 54 of the intake control valve 23 exceeds a predetermined value V2 which is in a side slightly more closed than a value equivalent to the valve opening 100%, that is, when the intake control valve 23 starts to close, the ECU 100 determines actual valve closing of the intake control valve 23 and stores the then crank angle as the actual valve closing timing CA_Pclose. The actual valve opening and the actual valve closing of the intake control valve 23 are thus detected by the ECU 100 and the valve opening sensor 54.

It should be noted that herein, the actual valve opening and the actual valve closing of the intake control valve 23 are detected at the opening start and the closing start of the intake control valve 23, but at any timing from the start to the end of the valve opening of the intake control valve 23 and at any timing from the start to the end of valve closing of the intake control valve 23, it is possible to detect the actual valve opening and the actual valve closing of the intake control valve 23 respectively. For example, at an intermediate opening, such as 30%, 50% or 70% (for example, V1', V2' in the figure), the actual valve opening and the actual valve closing may be detected. However, due to the characteristic of the valve opening sensor 54, there is a case where it is difficult to detect the opening start or the closing start of the intake control valve 23. In this case, it is preferable to detect the intermediate valve opening V1' or V2' in which an operation speed of the intake control valve 23 is high.

In addition, in consideration of an operation time Δt required for the actual opening and the actual closing of the intake control valve 23, the timing obtained by subtracting the operation time Δt from the target valve opening timing CA_Po and the target valve closing timing CA_Pc may be set as a new target valve opening timing CA_Po' and a new target valve closing timing CA_Pc' to control the intake control valve 23.

Next, control 12 at step S1112 in FIGS. 3A and 3B, that is, a target valve closing timing CA_Pc will be explained.

The ECU 100 executes calculation based upon the following expression to calculate the target valve closing timing CA_Pc.

$$CA\_Pc = CA\_Popen + CA\_Pw \quad (3)$$

That is, a target valve opening period CA_Pw is added to, not a target valve opening timing CA_Po, but an actual valve opening timing CA_Popen to calculate the target valve closing timing CA_Pc. This is based upon the following reason.

Since in a system using such intake control valve 23, an air quantity is controlled in accordance with the opening/closing timing of the intake control valve 23, it is important to accurately control the valve opening timing and the valve closing timing. Herein, as the concept, there is a method of adding the target valve opening period CA_Pw to the target valve opening timing CA_Po to calculate the target valve closing timing CA_Pc. However, there is the aforementioned time lag between when the valve opening signal and the valve closing signal are sent to the intake control valve 23 at the target valve opening timing CA_Po and at the target valve closing timing CA_Pc respectively and when the intake control valve 23 starts to move in response to the signals, and yet this time lag is lengthened, for example, when a battery voltage is not more than a certain value or when a bearing of the intake control valve 23 is deteriorated. Even if the valve opening signal or the valve closing signal is sent at the accurate timing, the actual valve opening timing or the actual valve closing timing varies, causing variations in the intake air quantity.

Herein, if it is assumed that the target valve closing timing CA_Pc is calculated not from the actual valve opening timing CA_Popen but from the target valve opening timing CA_Po the variation doubles due to variations in the time: ag from the target valve opening timing CA_Po to the actual valve opening timing, and variations in the time lag from the target valve closing timing CA_Pc to the actual valve closing timing.

In contrast to it, if it is assumed that the target valve closing timing CA_Pc is calculated from the actual valve opening timing CA_Popen, variations in the time lag from the target valve opening timing CA_Po to the actual valve opening timing are ignored and only the time lag from the target valve closing timing CA_Pc to the actual valve closing timing are the cause of the variations. That is, as compared to the former, this case has an advantage that the causes of the variations are reduced, thereby making it possible to control the variations in an air quantity.

Herein, a case where a valve opening period is set constant and valve opening timing is changed is compared with a case where the valve opening timing is set constant and the valve opening period is changed. The test results of the comparison are shown in FIGS. 21 and 22 respectively.

Figure 21:
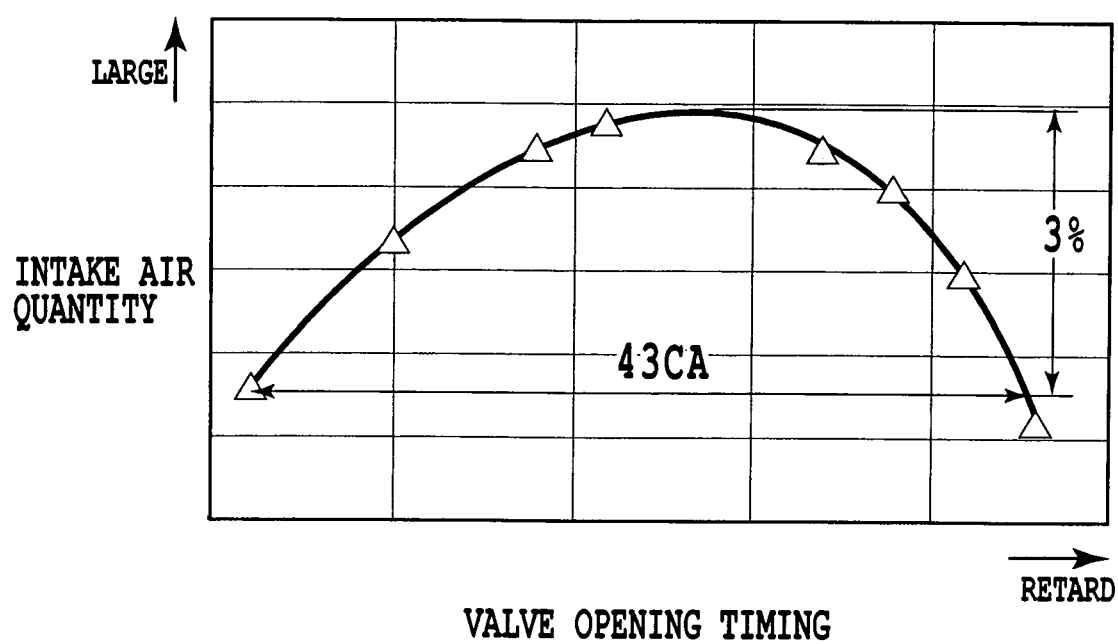
FIG. 21 is a graph showing influence to an air quantity due to a deviation of valve opening timing.
Figure 22:
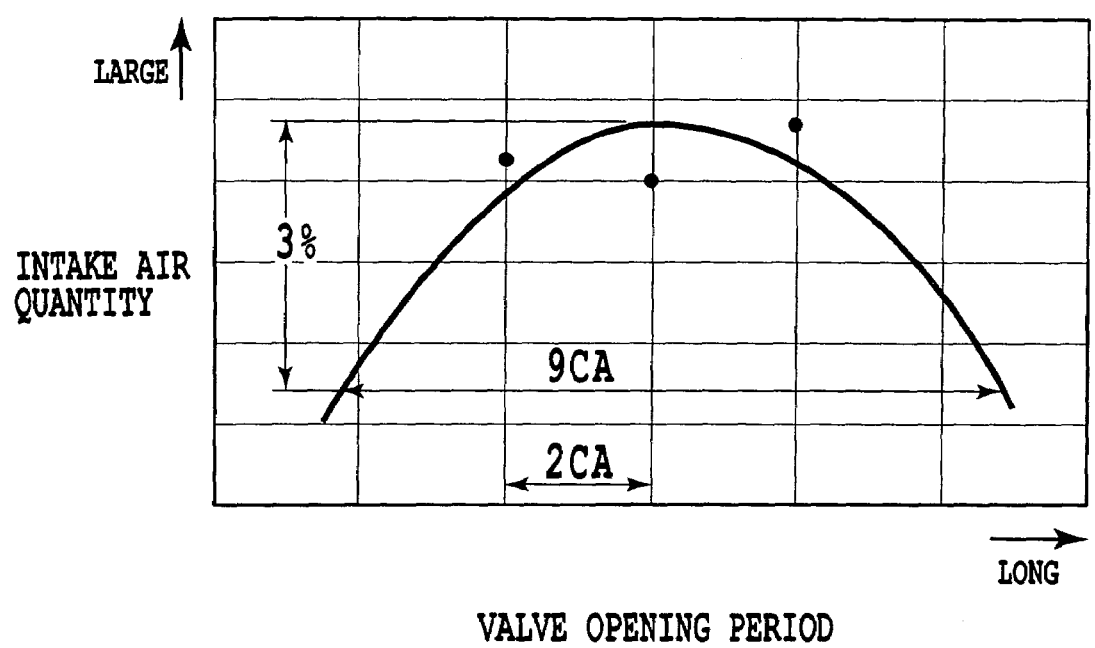
FIG. 22 is a graph showing influence to an air quantity due to a deviation of a valve opening period.

First, as shown in FIG. 21, when the valve opening period is set constant and the valve opening timing is changed, the deviation of the valve opening timing of 43 CA (crank angle) is allowed for controlling the deviation of the air quantity to less than 3%. On the other hand, as shown in FIG. 22, when the valve opening timing is set constant and the valve opening period is changed, only the deviation of the valve opening period of 9 CA (crank angle) is allowed for controlling the deviation of the air quantity to less than 3%. From this result, it is, understood that the deviation of the opening period of the intake control valve causes the air quantity variation which is five times that due to the valve opening/closing timing. Accordingly, for restricting the air quantity variation, it is more important to deviate the valve closing timing in response to the deviation of the valve opening timing rather than control the valve opening timing and the valve closing timing independently. According to the present embodiment thus, since the target valve closing timing CA_Pc can be deviated in accordance with a deviation amount from the target valve closing timing CA_Pc to the actual valve opening timing CA_Popen, it is possible to restrict the air quantity variation at the minimum.

It should be noted that in the conventional air quantity control using a variable valve timing mechanism for mechanically changing opening timing of an intake valve, air fluctuates relatively slower than in an inertia supercharging by high-speed air like the present embodiment. Therefore, an intake air quantity is determined by an in-cylinder volume and an intake air quantity at the closing time of the intake valve, and even if the valve opening timing deviates, the intake air quantity is not so much influenced.

Herein, the following method may be adopted for further improving accuracy. That is, in a case of the same valve opening period, as the actual valve opening period of the intake control valve 23 is retarded more from the target valve opening period, the intake air quantity increases. Therefore, the valve closing timing is advanced by the corresponding amount to shorten the valve opening period. That is, a new target valve closing timing CA_Pc' is calculated according to the following expression.

$$CA\_Pc' = CA\_Popen + CA\_Pw - \alpha \times (CA\_Popen - CA\_Po) \quad (4)$$

Where, α is a constant obtained by experiments or the like.

Next, calculation of the after-valve-opening air quantity Ga 2 at step S1116 in FIGS. and 3A and 3B will be explained. At this state, the actual valve opening timing CA_Popen and the actual valve opening period CA_Pwidth as actual values, and the port pressure P4 at the actual valve opening timing CA_Popen are already determined. Accordingly, based upon these three values, the after-valve-opening air quantity Ga 2 as an actual value and also an estimation value is calculated by using the after-valve-opening air quantity map in FIG. 12. Thereby, the after-valve-opening air quantity Ga 2 closer to a real value than the target after-valve-opening air quantity Ga 2_trg can be obtained and by using this value, a total air quantity Ga is obtained (step S1117) and can be supplied for engine control.

In the present embodiment, an initial air inflow during an intake stroke is made while retaining the port pressure, but without retaining a high port pressure of the previous intake stroke, the initial air inflow may be generally constant. In this case, by defining the before-valve-opening air quantity Ga 1, which is the initial flowing air quantity, as a constant value, or by omitting the process of calculating the before-valve-opening air quantity, the target value Ga 2_trg of the after-valve-opening air quantity as the latter flowing air quantity may be determined.

In this first aspect, the ECU 100 forms intake control valve controlling means, target air quantity determining means, pressure estimating means, target valve opening timing determining means, downstream-side pressure determining means, target valve opening period determining means, target valve closing timing determining means, actual valve opening period determining means, actual air quantity estimating means and control amount determining means. Pressure detecting means is formed by the pressure sensor 55. Valve opening detecting means and valve closing detecting means are formed by the ECU 100 and the valve opening sensor 54.

[Second Aspect of Engine Control]

Hereinafter, a second aspect of the engine control in the present embodiment will be explained. The second aspect has the feature with respect to estimation of an intake air quantity. Each map, which will be described later, is in advance drafted through experiments and analyses and is stored in the ECU 100.

Figure 23B:
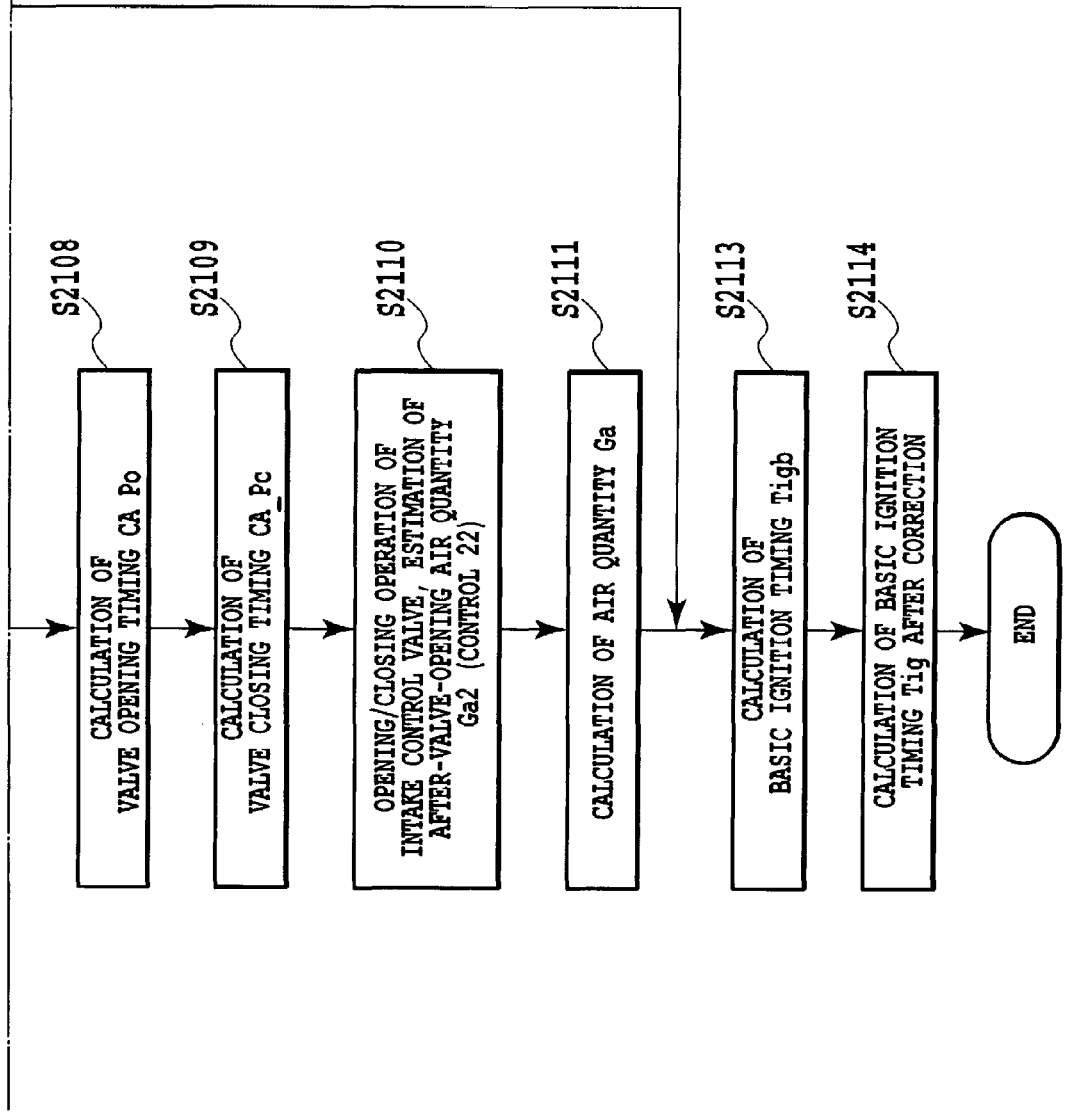

FIGS. 23A and 23B each show a main routine of the second aspect of the engine control. This main routine is executed for each cylinder and for each predetermined crank angle.

First, at step S2101, a target air quantity Ga_trg, which is a target value of an air quantity supplied to one cylinder, is calculated. Herein first, an engine rotational speed Ne and an accelerator opening Ac, which are calculated and detected based upon a signal of the crank angle sensor 28 and a signal of the accelerator opening sensor 30 respectively, are acquired. And torque required for the engine, i.e., the target torque Tt is determined based upon the accelerator opening Ac. Naturally, as the accelerator opening Ac increases, the target torque Tt increases. Next, a target air quantity Ga_trg is calculated with a target air quantity map shown in FIG. 4, based upon the engine rotational speed Ne and the target torque Tt. It should be noted that the target air quantity Ga_trg, the before-valve-opening air quantity Ga 1, the after-valve-opening air quantity Ga 2 and the like are defined as an air quantity (g/cylinder) aspired during one intake stroke per one cylinder of the engine.

Next, at step S2102, it is determined based upon a target air quantity Ga_trg and an engine rotational speed Ne whether or not the intake control valve 23 is in an operational region. This determination is made using an operational region map shown in FIG. 5. In this map, the entire region is divided into an operational region A and a non-operational region B. The operational region A exists at a low rotational speed side and an intermediate/high load side of the engine. When the engine operating condition is in an operational region A, the intake control valve 23 is operated, thereby causing an increase of an air quantity. When the engine operating condition is in a non-operational region B, the intake control valve 23 is prohibited to be operated. The border line between the operational region A and the non-operational region B corresponds to a region where the maximum air quantity is acquired at the non-operational state of the intake control valve.

When the target air quantity Ga_trg and the engine rotational speed Ne are in the operational region A, the process goes to step S2103, wherein an operational flag turns on. On the other hand, when the target air quantity Ga_trg and the engine rotational speed Ne are not in the operational region A (that is, when the target air quantity Ga_trg and the engine rotational speed Ne are in the operational region B), the process goes to step S2104, wherein the operational flag turns off. A determination is thus made as to presence/absence of a demand for an operation of the intake control valve based upon an engine operating condition.

Next, the process goes to step S2105, wherein it is determined whether or not the operational flag is ON. When it is OFF, the process goes to step S2112, wherein an air quantity Ga flowing into the corresponding cylinder is estimated based upon a detection value of the air flow meter 21 and thereafter, the process goes to step S2113. On the other hand, when it is ON, the process goes to step S2106, wherein control 21, which will be described later, is executed, thereby estimating a before-valve-opening air quantity Ga 1. It should be noted that since this main routine is executed in order for each cylinder, at the start time and end time of operating the intake control valve 23 an air quantity estimation (steps S2106 to S2111) is executed on condition that a part of cylinders is in an operational state and an air quantity estimation (step S2112) is executed on condition that the rest of the cylinders is in a non-operational state.

After step S2106, the process goes to step S2107, wherein a target value Ga 2_trg of the after-valve-opening air quantity is calculated according to the expression: Ga 2_trg=Ga_trg−Ga 1.

Figure 24:
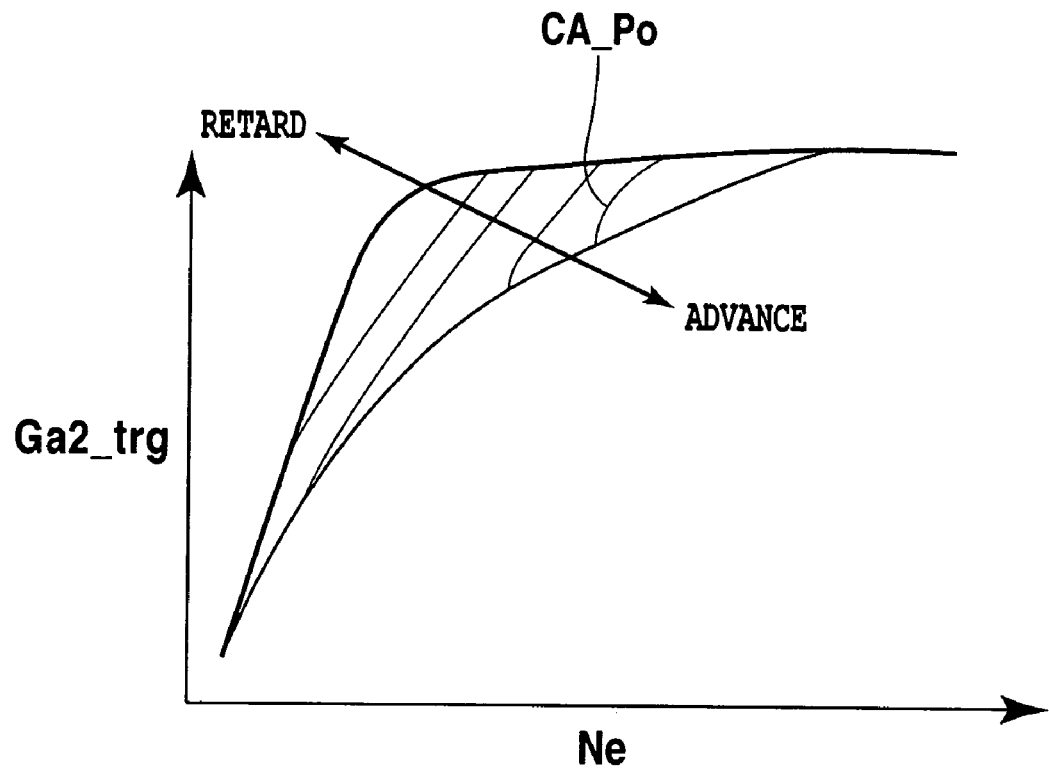
FIG. 24 is a map for valve opening timing of an intake control valve.

Next, the process goes to step S2108, wherein valve opening timing CA_Po of the intake control valve 23 is determined based upon an engine rotational speed Ne and an after-valve-opening air quantity target value Ga 2_trg with reference to valve opening timing map in FIG. 24.

Figure 25:
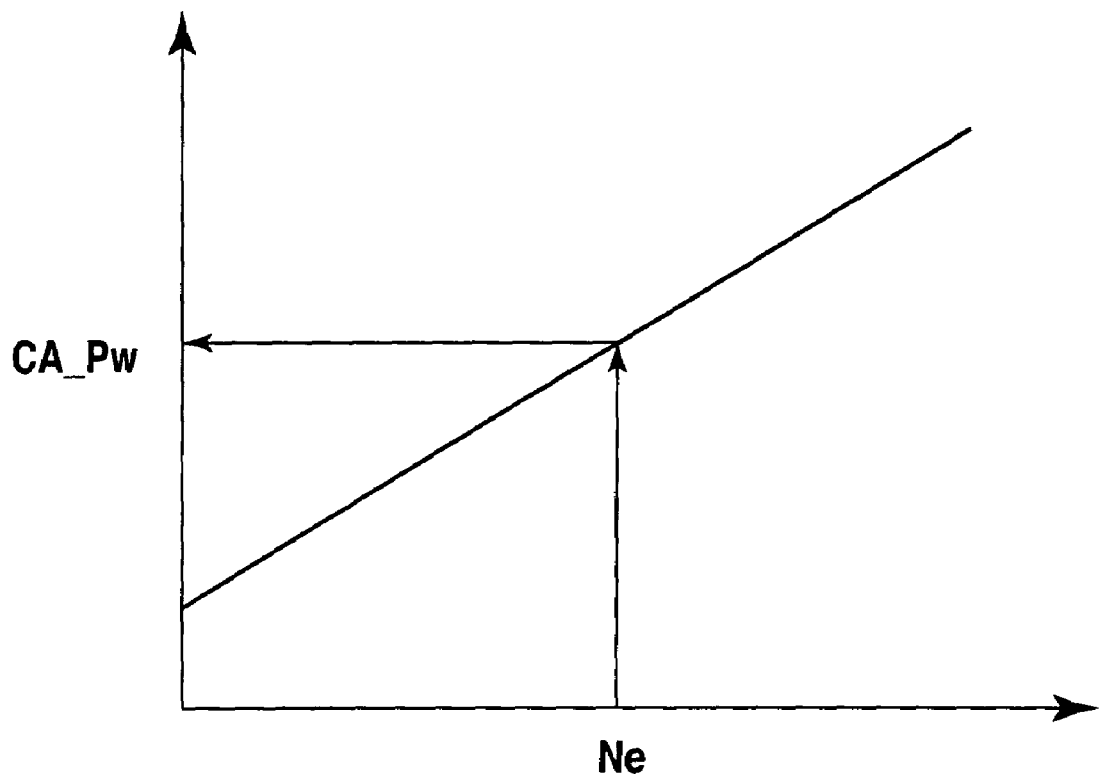
FIG. 25 is a map for a valve opening period of an intake control valve.

Next, at step S2109, valve closing timing CA_Pc of the intake control valve 23 is calculated and determined based upon an engine rotational speed Ne by using a value CA_Pw of a valve opening period obtained from a valve opening period map in FIG. 25.

At next step S2110, control 22, which will be described later, is executed to open/close the intake control valve 23 and also estimate the after-valve-opening air quantity Ga 2 at the valve opening timing CA_Po determined at step S2108 and at the valve closing timing CA_Pc determined at step S2109.

When the before-valve-opening air quantity Ga 1 and the after-valve-opening air quantity Ca 2 are determined by its estimation, the process goes to step S2111, wherein an air quantity Ga as an estimation value is calculated by the expression: Ga=Ga 1+Ga 2.

Figure 26:
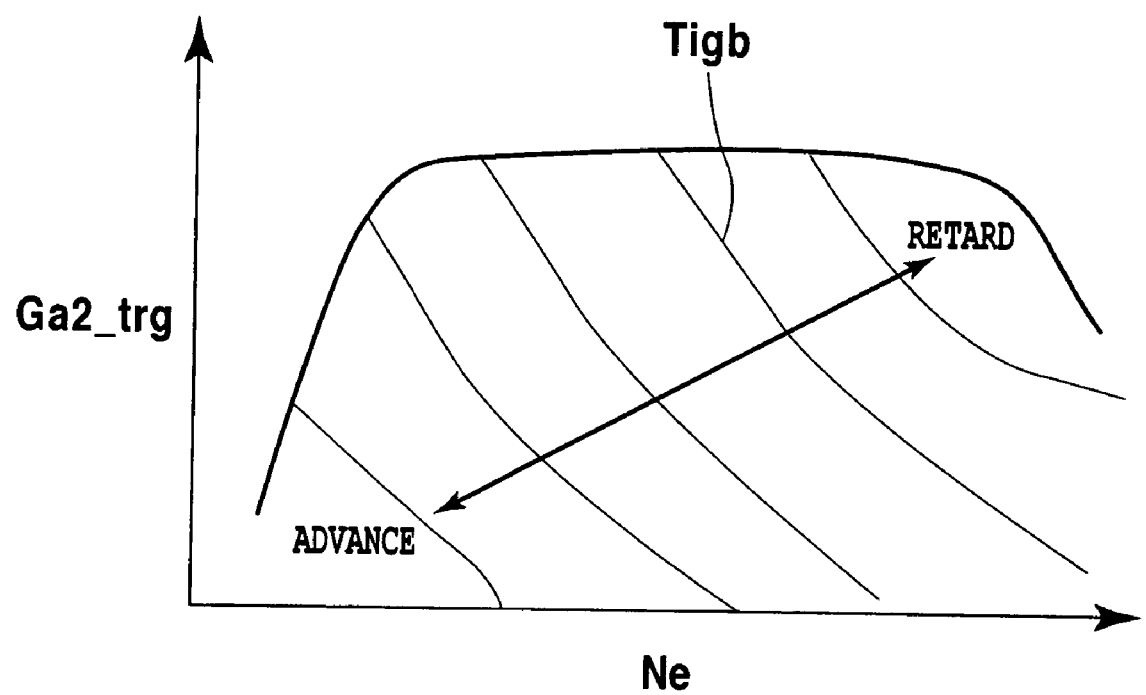
FIG. 26 is a map for basic ignition timing.

Next, at step S2113, wherein basic ignition timing Tigb is determined based upon an engine rotational speed Ne and a target air quantity Ga_trg with reference to a basic ignition timing map in FIG. 26.

Figure 27:
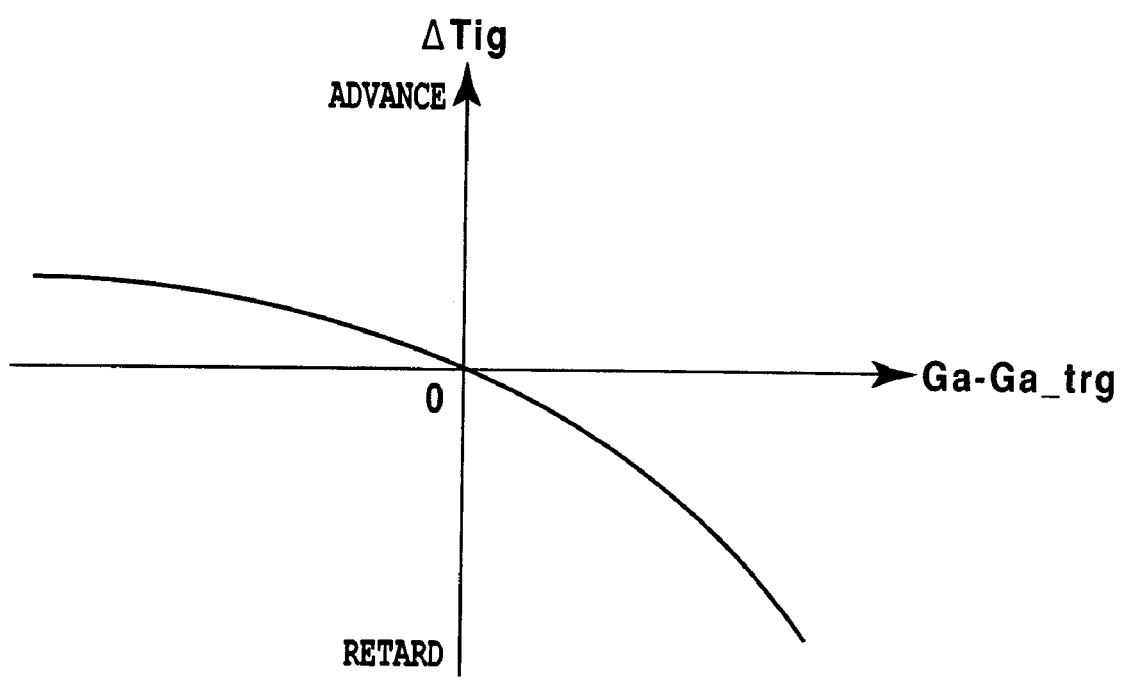
FIG. 27 is a map for an ignition timing correction amount.

At next step S2114, the ignition timing is corrected to calculate final ignition timing Tig. That is, an ignition timing correction amount ΔTig (BCA) is determined based upon a difference (=Ga−Ga_trg) between the estimation air quantity Ga and the target air quantity Ga_trg with reference to an ignition timing correction amount map in FIG. 27. In addition, the ignition timing correction amount A Tig is added to the basic ignition timing Tigb to calculate the final ignition timing Tig. Then, the present routine ends. Herein, in a case where the estimation air quantity is greater than the target air quantity, the ignition timing is retarded to lower the torque. On the other hand, in a case where the estimation air quantity is smaller than the target air quantity, the ignition timing is advanced to restrict reduction of the torque. This causes the torque fluctuation due to air quantity variations between cylinders to be restricted.

It should be noted that in a diesel engine, in order to achieve the similar object, for example, in a case where an estimation air quantity is greater than a target air quantity, fuel injection timing is retarded or a fuel injection quantity is reduced.

Herein, as an example of a control amount, only the ignition timing is explained, but a fuel injection quantity and fuel injection timing as other control amounts may be determined with the similar logic. In this case, the target ignition timing replaces the target fuel injection quantity and the target fuel injection timing, the ignition timing correction amount replaces the fuel injection correction quantity and the fuel injection timing correction amount, and the final ignition timing replaces the final fuel injection quantity and the final fuel injection timing. In a case where a lean combustion is carried out like the present embodiment, a fuel injection quantity may be determined based upon an estimation air quantity and a target air-fuel ratio. The ECU 100 controls the ignition plug 14 and the injector 10 of each cylinder based upon these control amounts.

Figure 28:
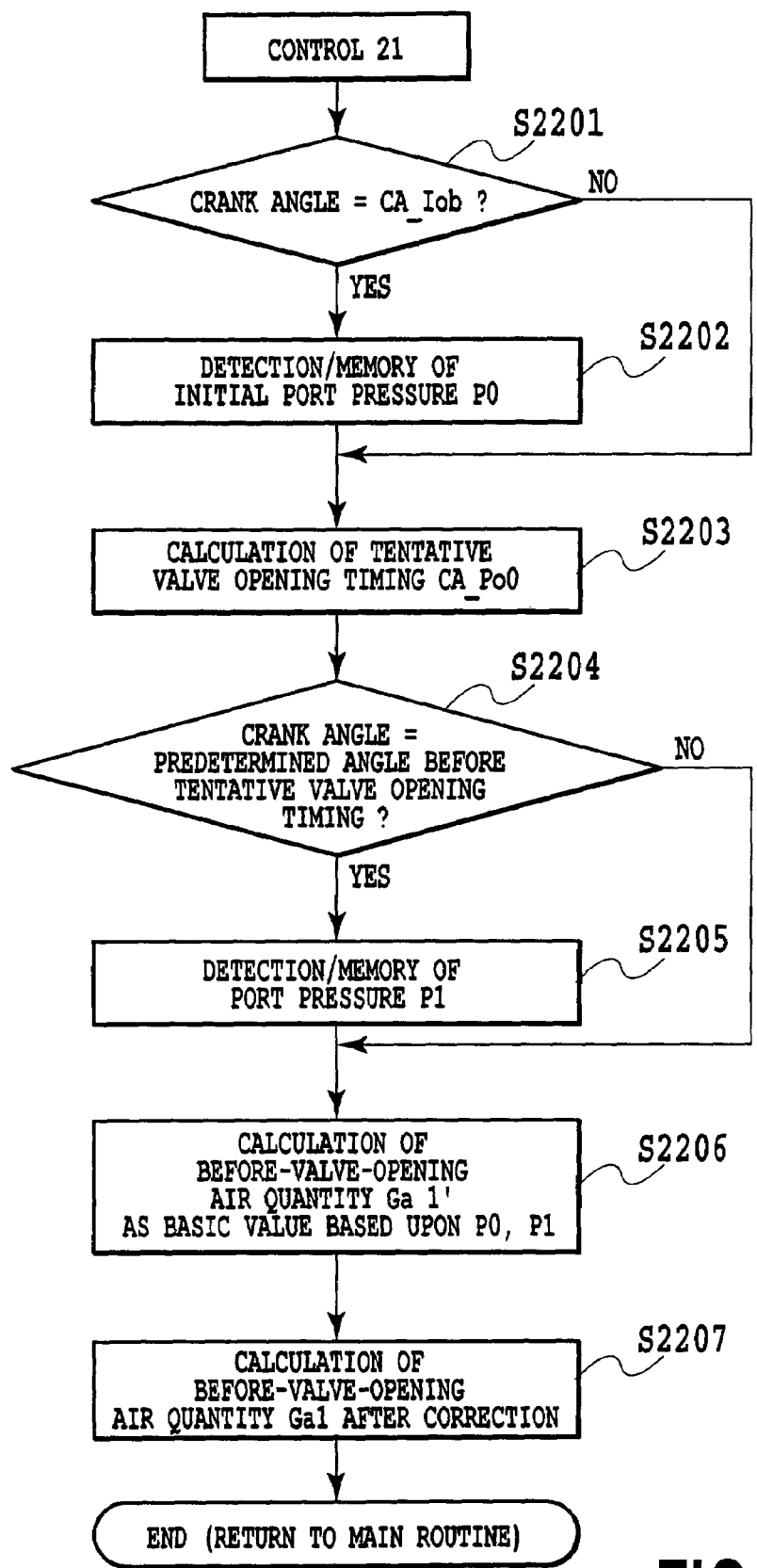
FIG. 28 is a flow chart of a routine for control 21.
Figure 29:
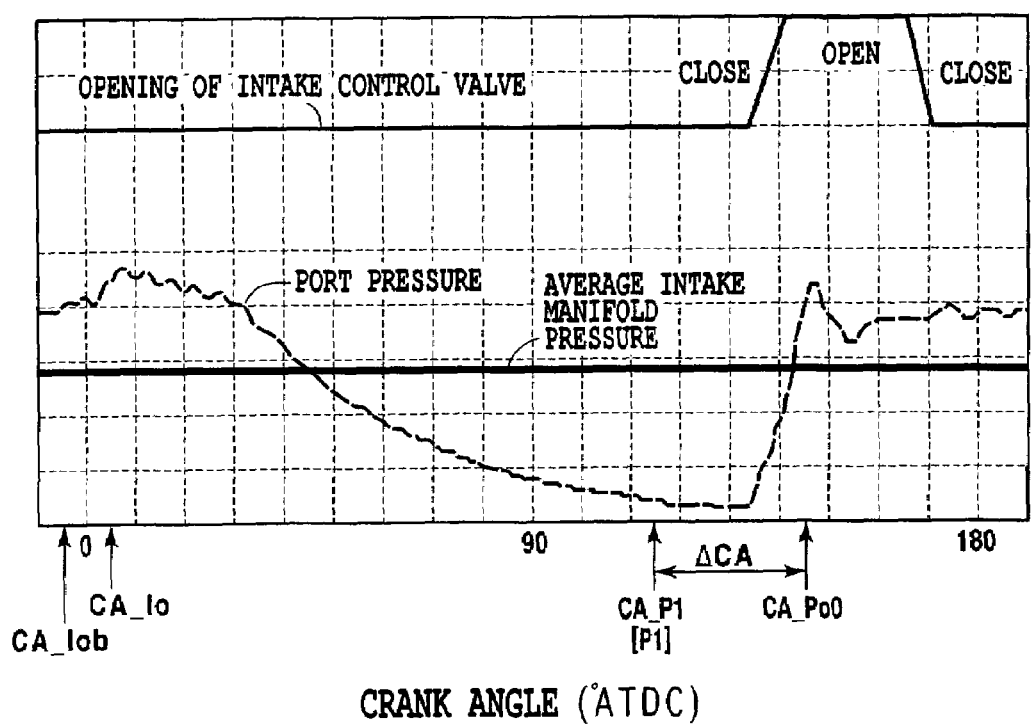
FIG. 29 is a supplementary time chart with respect to the control 21.

Next, the control 21 will be explained with reference to FIG. 28 for calculating a before-valve-opening air quantity Ga 1. Please refer to each timing related to the control 21 shown in FIG. 29 as needed.

First, at step S2201 it is determined whether or not an actual crank angle detected by the crank angle sensor 28 is a predetermined angle CA_Iob. The predetermined angle CA_Iob is an angle immediately before the opening of the intake valve 16, in other words, an angle which is a predetermined angle before the valve opening timing CA_Io, for example, an angle which is 5° CA before the valve opening timing of the intake valve 16.

When the crank angle is the predetermined angle CA_Iob, the port pressure at the predetermined angle CA_Iob is detected by the pressure sensor 55 at step S2202 and is temporarily stored as an initial port pressure P0 in the memory of the ECU 100. The reason such initial port pressure P0 is detected and stored will be explained.

After step S2202, the process goes to step S2203. On the other hand, when it is determined at step S2201 that the crank angle is not the predetermined angle CA_Iob, the step S2202 is skipped and the process goes to step S2203. At step S2203, tentative valve opening timing CA_Po0 of the intake control valve 23 is calculated. Herein, in order to determine timing for calculating the before-valve-opening air quantity Ga 1, the tentative valve opening timing CA_Po0 of the intake control valve 23 is temporarily determined based upon an engine rotational speed Ne and an air quantity target value Ga_trg from the valve opening timing map in FIG. 24.

Next, at step S2204, it is determined whether or not an actual crank angle is timing CA_P1 which is a predetermined angle ΔCA before the tentative valve opening timing CA_Po0 of the intake control valve 23. In the present embodiment, the predetermined angle ΔCA is set as 30° CA. When it is determined that the actual crank angle is the timing CA_P1 which is the predetermined angle ΔCA before the tentative valve opening timing CA_Po0 of the intake control valve 23, the process goes to step S2205, wherein a port pressure at the corresponding timing CA_P1 is detected by the pressure sensor 55 and is temporarily stored as P1 in the memory of the ECU 100. Further, thereafter, the process goes to step S2206. On the other hand, when it is determined that the actual crank angle is not the timing CA_P1, the step S2205 is skipped and the process goes to step S2206.

Figure 30:
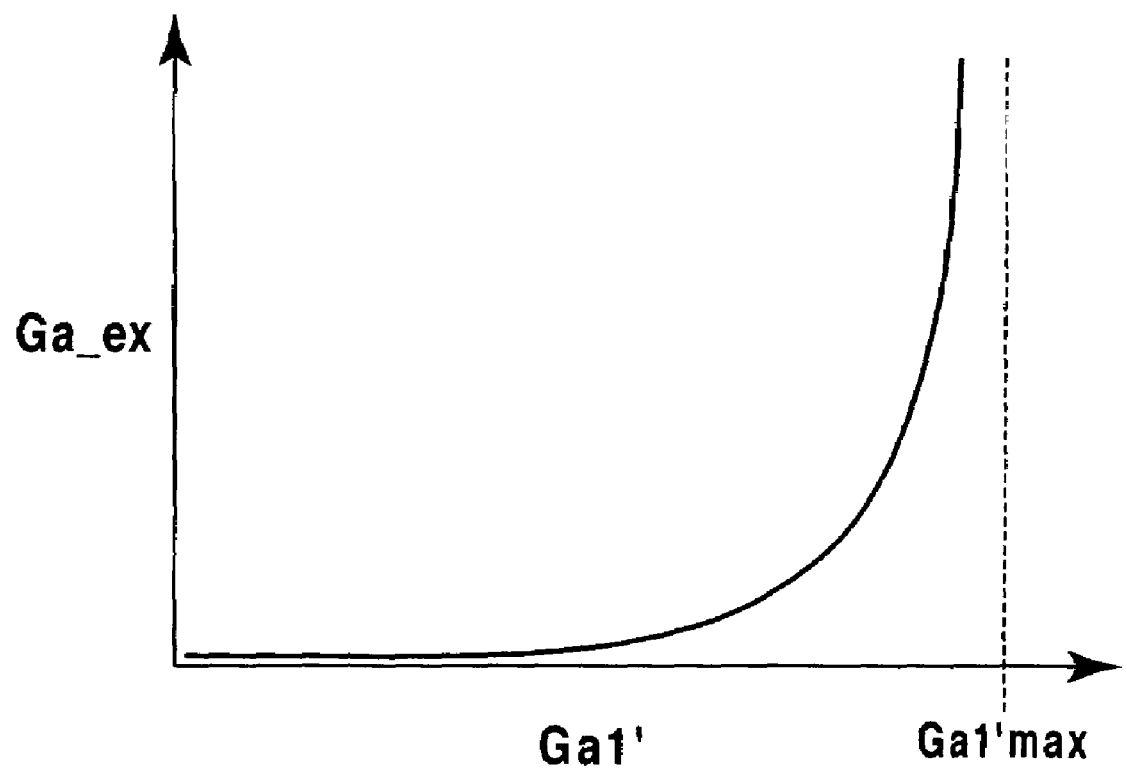
FIG. 30 is a blow-through amount map.

At step S2206, a before-valve-opening air quantity Ga 1' as a basic value is calculated based upon an initial port pressure P0 and a port pressure P1 with a method to be described later. And, thereafter, at step S2207 a correction is made in consideration of blow-through of an intake air into an exhaust system during an overlap period to calculate a before-valve-opening air quantity Ga 1 after a final correction. Then, the present routine ends. Herein, a blow-through amount Ga_ex is calculated using a blow-through amount map in FIG. 30 based upon a basic value Ga 1' of the before-valve-opening air quantity and the blow-through amount Ga_ex is subtracted from the basic value Ga 1' of the before-valve-opening air quantity to calculate the before-valve-opening air quantity Ga 1 after the final correction (=Ga 1'−Ga_ex). In the map, Ga 1' max is the maximum value of the before-valve-opening air quantity based the cylinder volume at the overlap time (capable of assuming this as nearly a top dead center during an intake stroke). In a case of no overlap, since the blow-through does not occur, this correction is omitted.

The control 21 will be hereinafter explained. First, the outline of the control carried out here is to detect port pressures P0 and P1 respectively at timings before and after the opening of the intake control valve 23 and to calculate the before-valve-opening air quantity Ga 1' as a basic value based upon these port pressures.

With respect to estimation of the before-valve-opening air quantity Ga 1' at step S2206, an air quantity flowing into the cylinder from the port passage 11b before the opening of the intake control valve is equal to an air quantity reduced from the port passage 11b. The volume of the port passage 11b is geometrically defined and a known constant value. Therefore, the before-valve-opening air quantity Ga 1' can be estimated by a change of air density in the port passage 11b from immediately before the opening of the intake valve 16 to immediately before the opening of the intake control valve 23.

Reduction of the port pressure occurring when air flows from the port passage 11b into the cylinder can be assumed as an adiabatic change. The change of the density is determined according to the next expression from the pressure P0 before the opening of the intake valve and also the pressure P1 before the opening of the intake control valve.

$$\rho1/\rho0=(P0/P1)^{(-1/k)} \quad (1)$$

Herein, ρ0 and ρ1 respectively are air density at the time of detecting P0 and P1. The respective ones are referred to as density before the opening of the intake valve and density before the opening of the intake control valve. "k" is a predetermined constant.

It should be noted that a sign "^" denotes power and the right side: (P0/P1)^(−1/k) denotes (−1/k) power of (P0/P1) (hereinafter the same).

Accordingly, the before-valve-opening air quantity Ga 1' flowing into the cylinder is calculated by the next expression.

$$Ga1'=V\times(\rho0-\rho1)=V\times\rho0\times(1-(P0/P1)^{(-1/k)}) \quad (2)$$

Herein, V denotes a volume of the port passage 11b.

The density before the opening of the intake valve ρ0 can be calculated by an intake air temperature and an intake manifold pressure. In the present embodiment, values detected by an intake temperature sensor 42 and an intake pressure sensor 41 are used as the intake temperature and the intake manifold pressure.

As a result, the before-valve-opening air quantity Ga 1' can be calculated from the intake temperature, the intake pressure, the pressure P0 before the opening of the intake valve and the pressure P1 before the opening of the intake control valve according to the expression (2). In the present embodiment, the ECU 100 performs such calculation to calculate the before-valve-opening air quantity Ga 1'.

In order to further improve accuracy, it is preferable to consider a heat quantity which air receives from an intake system, a cylinder head and the like. A rise amount of an intake temperature in consideration of influence of the received heat can be calculated.

$$C=A\times\log_{10} Ne+B$$

Herein, A or B is a constant value obtained by experiments or the like.

Next, with respect to steps S2204 and S2205, the reason the detection timing CA_P1 of the port pressure P 1 is set as a predetermined angle ΔCA before the tentative valve opening timing CA_Po0 of the intake control valve 23 will be explained.

In a case where the before-valve-opening air quantity Ga 1 is a positive value (possibly a negative value upon occurrence of backflow from an exhaust system), Ga 2_trg<<Ga_trg. The opening timing of the intake control valve based upon the target value of the after-valve-opening air quantity Ga 2_trg is advanced more than the opening timing of the valve control valve assumed from the initial target air quantity GA_trg. For securely advancing the detection timing of the port pressure P1 more than the opening timing of the intake control valve in consideration of the deviation of the opening timing of the intake control valve, the detection timing of the port pressure P1 (that is, calculation timing of the before-valve-opening air quantity Ga 1) is set as a predetermined angle ΔCA before the tentative valve opening timing CA_Po0 of the intake control valve 23. That is, the detection timing CA_P1 of the port pressure P1 is set to meet a relation $$CA\_P1 < CA\_Po < CA\_Po0 \qquad (3).$$

Figure 31:
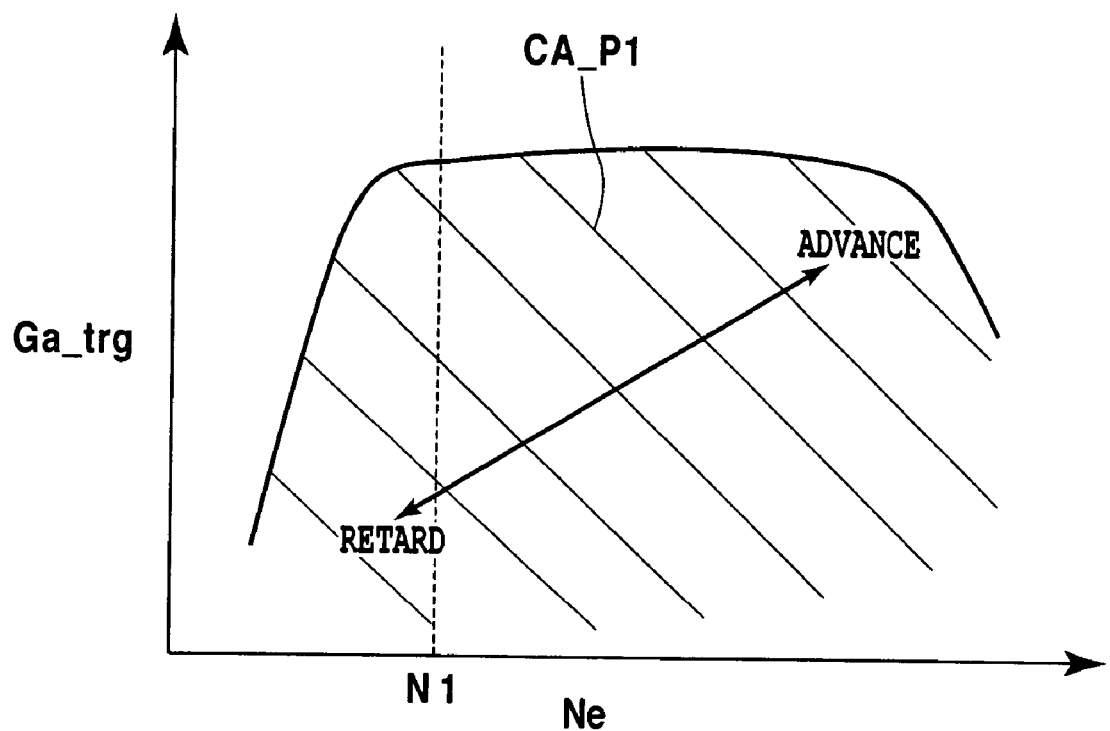
FIG. 31 is a detection timing map.
Figure 32:
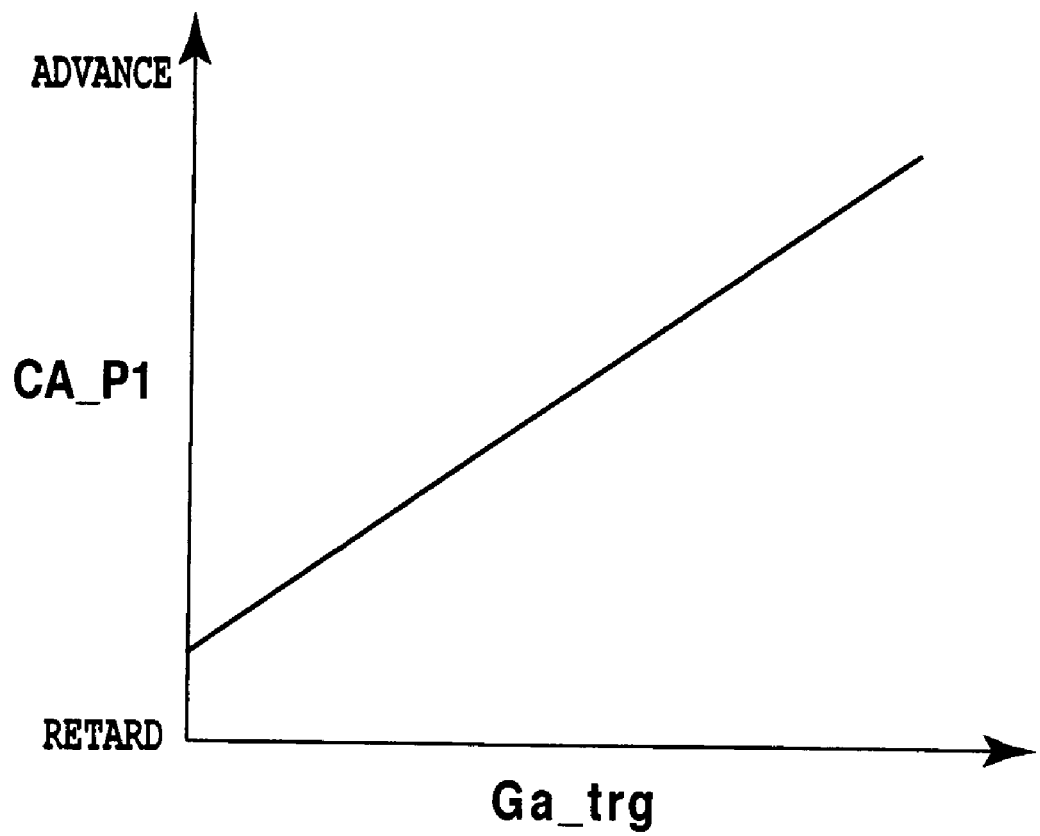
FIG. 32 shows a relation in a detection timing map when an engine rotational speed Ne=N1.

Herein, the detection timing CA_P1 (° ATDC) of the port pressure P1 may be determined using a detection timing map shown in FIG. 31, based upon an engine rotational speed Ne and a target air quantity Ga_trg. When the engine rotational speed Ne=N1, a relation between the detection timing CA_P1 of the port pressure P1 and the target air quantity Ga_trg on the map is as shown in FIG. 32.

Next, with respect to step S2207, a method of improving accuracy in blow-through correction during the overlapping will be hereinafter described.

First, the timing for counting the before-valve-opening air quantity Ga 1 is divided into two periods, that is, (1) from opening time of an intake valve to closing time of an exhaust valve and (2) from closing time of an exhaust valve to opening time of an intake control valve. And a calculation logic as shown in the aforementioned routine is applied to an air quantity in the above (1) as it is (refer to Ga (1)). That is, the blow-through correction is made to a basic before-valve-opening air quantity Ga (1)' to determine Ga (1). On the other hand, a logic obtained by subtracting the blow-through correction from the calculation logic as shown in the aforementioned routine is applied to an air quantity in the above (2) (refer to Ga (2)). And finally a sum of the above Ga (1) and Ga (2) is set as a final before-valve-opening air quantity Ga 1.

Next, with respect to steps S2204 and S2205, a correction for reducing a deviation between the detection timing of the port pressure P1 and the opening timing of the intake control valve and a calculation of the before-valve-opening air quantity Ga 1 using a port pressure P1 detected at new detection timing are will be explained.

It is preferable to detect a port pressure P1 at timing when the intake valve is lifted by more than a predetermined value and high-pressure air retained in the port passage 11b flows sufficiently into a cylinder, whereby a pressure difference between the port pressure and the in-cylinder pressure becomes sufficiently small. Accordingly, it is preferable that the detection timing of the port pressure P1 is as close to the opening timing of the intake control valve 23 as possible, and it is ideal to detect the port pressure P1 at the opening timing of the intake control valve 23, that is, at timing when the intake control valve 23 itself does not start to open although the ECU 100 has sent a valve opening signal to the intake control valve 23. However, in the above control 21, for securely avoiding detection of the port pressure P1 after the intake control valve 23 is opened, the detection is made at timing before the valve opening timing.

Therefore, for reducing the deviation amount, it is preferable to adopt the following method.

First, a first method is a method in which, after a target value Ga 2_trg of the after-valve-opening air quantity is calculated (step S2107 in FIGS. 23A and 23B), a port pressure P1 at valve opening timing CA_Po of the intake control valve 23 is estimated to once more calculate a before-valve-opening air quantity Ga 1. The port pressure P1 is obtained by a cylinder volume change during an intake stroke and a port pressure change due to the cylinder volume change. The cylinder volume is a function of a crank angle and therefore, the cylinder volume change is determined from a detection value of the crank angle sensor 28. More specially, in a closed system, when a volume and a pressure are obtained at a point, the pressure after the volume is changed, can be calculated according to the following expression.

$$p2 = p1(v1/v2)^k \qquad (4)$$

However, p denotes a pressure, v denotes a volume, k denotes a predetermined coefficient, a suffix 1 denotes an initial state and a suffix 2 denotes "after a volume change".

Accordingly, by using the expression (4), the port pressure P1 at the opening timing CA_Po of the intake control valve 23 can be estimated. In other words, the port pressure P1 at the opening timing can be estimated, even without direct detection, by detecting pressures at two timings prior to this time.

In addition, a second method is a method in which a port pressure P1 at the opening timing CA_Po of the intake control valve 23 is detected directly by the pressure sensor 55 and also a before-valve-opening air quantity Ga 1 is calculated based upon this detection value.

Figure 33:
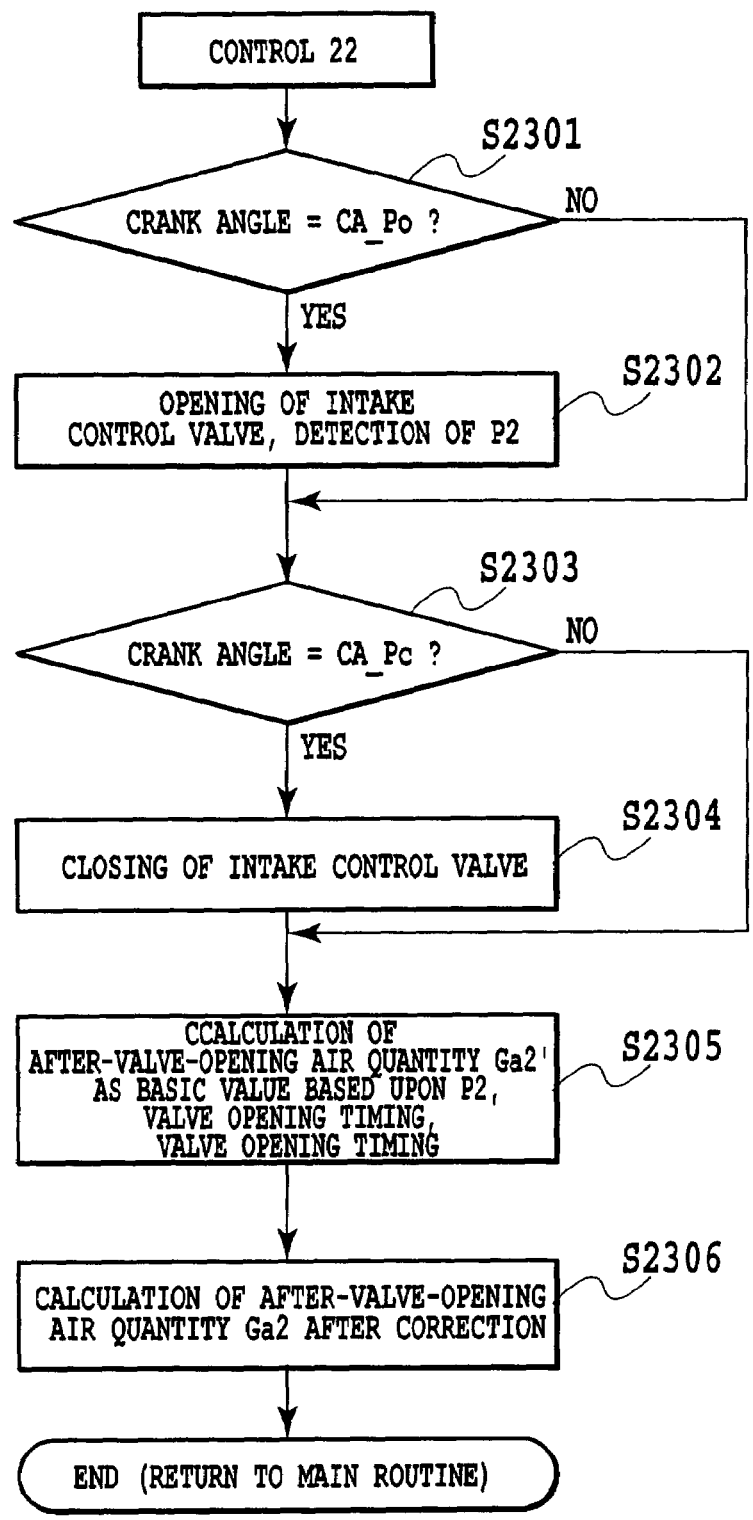
FIG. 33 is a flow chart of a routine of control 22.
Figure 34:
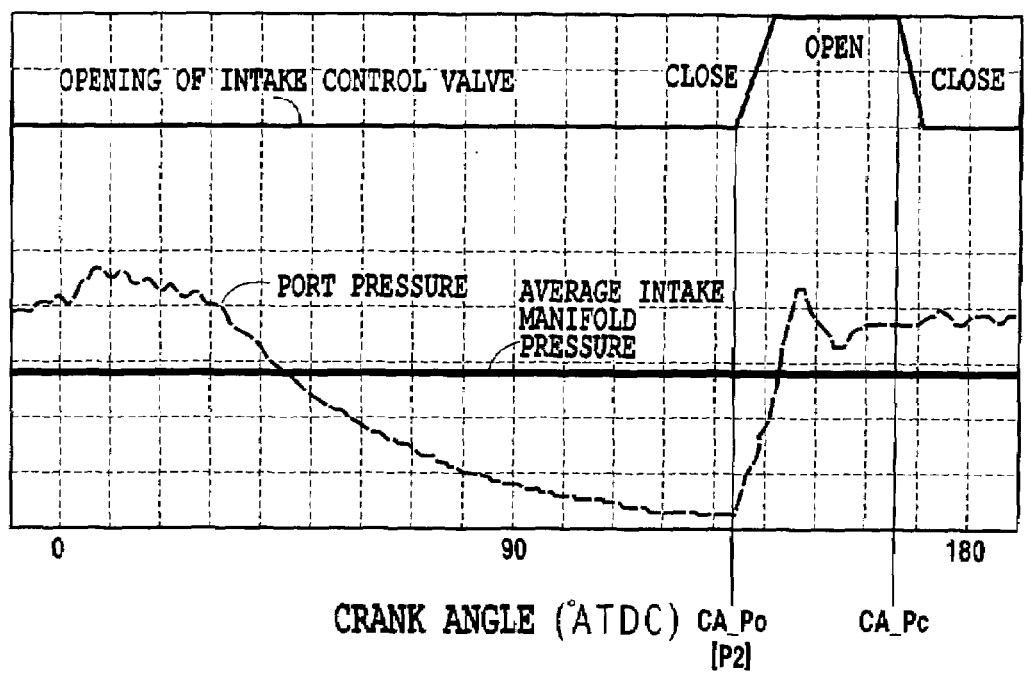
FIG. 34 is a supplementary time chart with respect to control 22.

Next, the control 22 will be explained with reference to FIG. 33 for estimating an after-valve-opening air quantity Ga 2. Please refer to each timing related to the control 22 shown in FIG. 34.

First, at step S2301 it is determined whether or not an actual crank angle detected by the crank angle sensor 28 is opening timing CA_Po of the intake control valve 23 obtained at step S2108 in FIGS. 23A and 23B.

When the crank angle is the valve opening timing CA_Po, the intake control valve 23 is opened at step S2302. That is, the ECU 100 outputs a valve opening signal to the intake control valve 23. And at the same time, the port pressure at this point is detected by the pressure sensor 55 and is temporarily stored as P2 in the memory of the ECU 100. Then, the process goes to step S2303. On the other hand, when it is determined at step S2301 that the crank angle is not the valve opening timing CA_Po, step S2302 is skipped and the process goes to step S2303.

At step S2303 it is determined whether or not an actual crank angle detected by the crank angle sensor 28 is closing timing CA_Pc of the intake control valve 23 obtained at step S2109 in FIGS. 23A and 23B.

When the crank angle is the valve closing timing CA_Pc, the intake control valve 23 is closed at step S2304. That is, the ECU 100 outputs a valve closing signal to the intake control valve 23. Then, the process goes to step S2305. On the other hand, when it is determined at step S2303 that the crank angle is not the valve closing timing CA_Pc, step S2304 is skipped and the process goes to step S2305.

At step S2305, a valve opening period CA_Pw of the intake control valve 23 is calculated according to the expression: CA_Pw=CA_Pc−CA_Po, and an after-valve-opening air quantity Ga 2' as a basic value is calculated based upon the port pressure P2 at the valve opening time, the valve opening timing CA_PO and the valve opening period CA_Pw with reference to an after-valve-opening air quantity map in FIG. 35. This respect will be in detail described later.

And next, at step S2306, a correction is made to the after-valve-opening air quantity based upon an average intake manifold pressure to calculate an after-valve-opening air quantity Ga 2 after a final correction. Then the present routine ends. This correction is made according to the following expression.

Ga2=Ga2'×(average intake manifold pressure)/(reference intake manifold pressure)   (5)

Herein, a pressure value detected by the intake pressure sensor 41 is used as the average intake manifold pressure.

Figure 35:
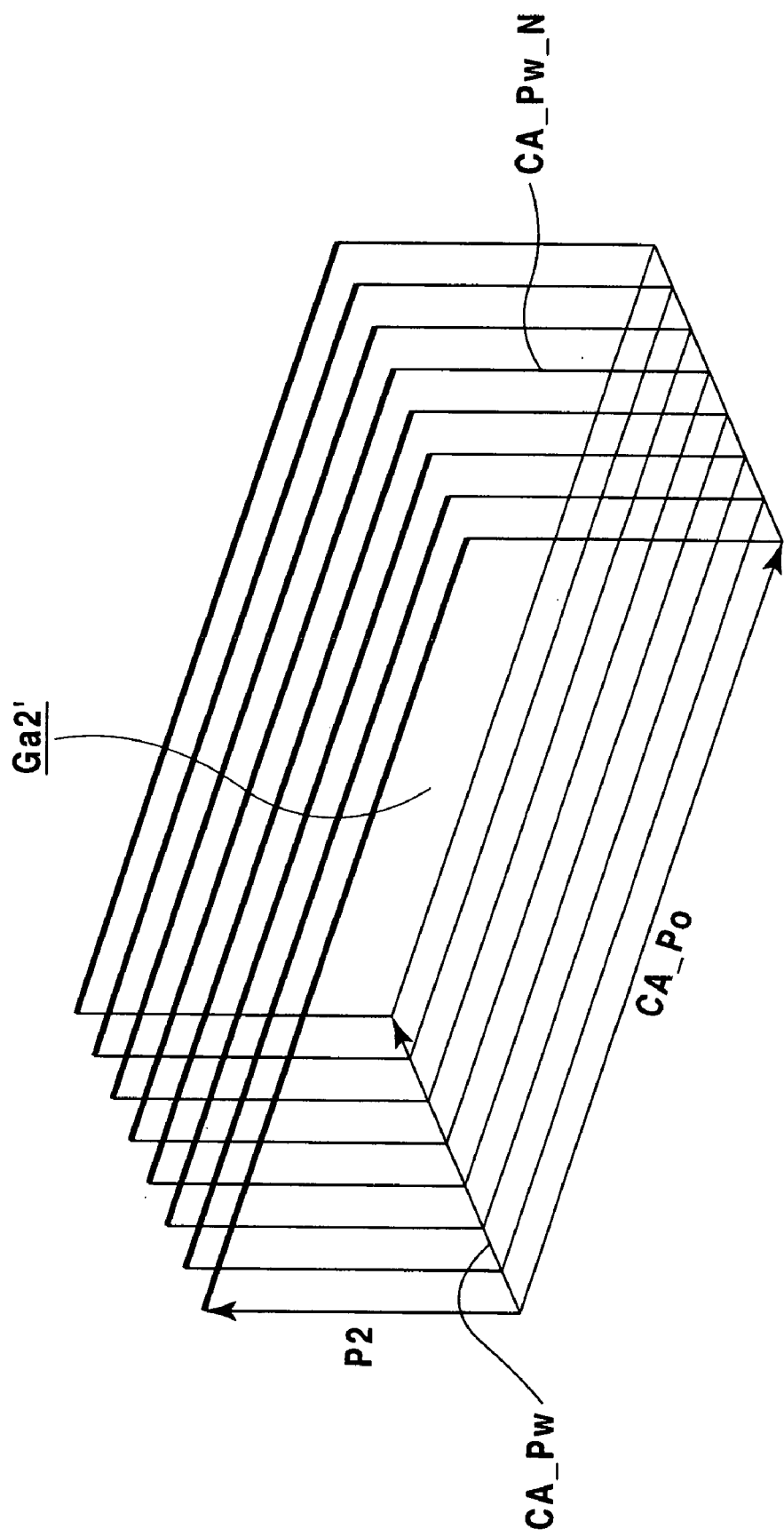
FIG. 35 is an after-valve-opening air quantity.

Further, the reference intake manifold pressure is a constant value in advance stored in the ECU 100 and more specifically an intake manifold pressure at the time of drafting the after-valve-opening air quantity map in FIG. 35.

Figure 36:
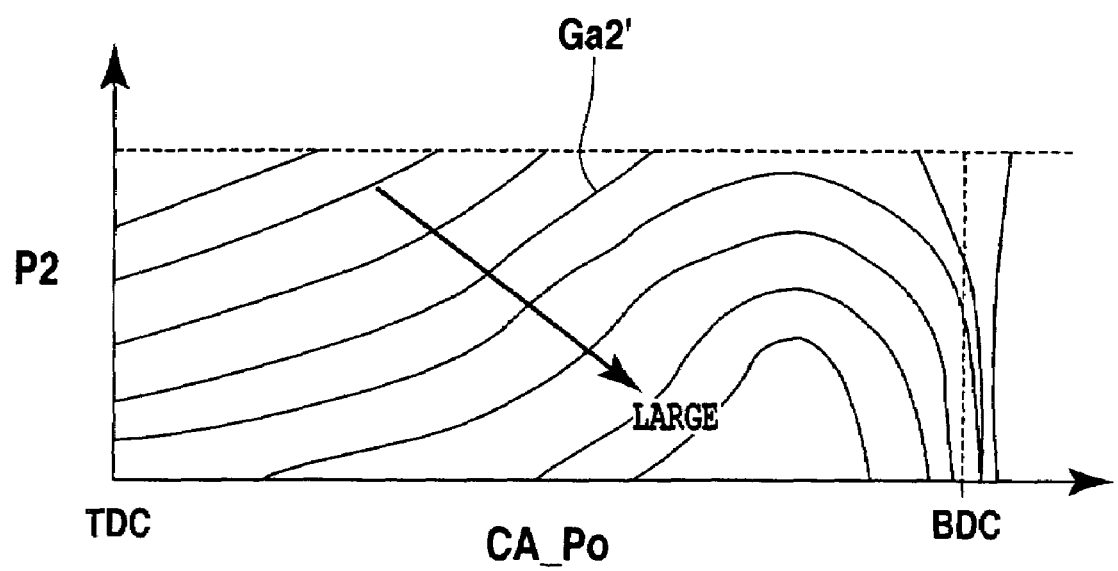
FIG. 36 is an after-valve-opening air quantity map for a certain constant valve opening period $CA\_Pw\_n$.

With respect to calculation of the after-valve-opening air quantity Ga 2' at step S2305, the after-valve-opening air quantity map in FIG. 35 is a three-dimensional map composed in order to be capable of calculating the after-valve-opening air quantity Ga 2' from three parameters of the port pressure P2 at the valve opening time, the valve opening timing CA_PO and the valve opening period CA_Pw. For example, the map in FIG. 36 is obtained by extracting a map at a certain valve opening period CA_Pw_n. TDC is a top dead center during an intake stroke and BDC is a bottom dead center during an intake stroke. As seen, as the valve opening timing CA_Po is retarded in the vicinity of the bottom dead center during an intake stroke, the after-valve-opening air quantity Ga 2' is reduced. This is because the period from the opening of the intake control valve 23 to the closing of the intake valve 16 is shortened, thereby reducing the air quantity flowing into the cylinder. This map is composed on condition that the closing of the intake control valve 23 and the closing of the intake valve 16 are carried out simultaneously. As a result, thus the after-valve-opening air quantity (in more detail, the basic value Ga 2') can be obtained by using the after-valve-opening air quantity map.

The inventors, as a result of serious studies, have found out that it is possible to estimate, from three parameters, the air quantity flowing into the cylinder when the intake control valve 23 is opened. In particular, the air quantity after the opening of the intake control valve 23 depends largely on the opening timing of the intake control valve 23 and the port pressure at that point. The after-valve-opening air quantity map is drafted through the processes such as experiments and analyses based upon such findings. In general, when the intake air quantity is designed to be increased, it is effective to reduce the port pressure P2 at the valve opening time (a pressure difference between the upstream side and the downstream side of the intake control valve increases, thereby speeding up the intake flow speed at the valve opening time), retard the valve opening timing CA_Po (the same reason and the air is pressed into the cylinder when the in-cylinder volume is large) or appropriately provide the valve opening period CA_Pw (the intake control valve closes immediately before backflow of the air occurs). However, the valve opening timing CA_Po has the optimal timing because of a relation between the port pressure P2 at the valve opening time, the in-cylinder volume, the valve opening period CA_Pw after the valve opening (or the closing timing of the intake valve) and the like.

In any case, by estimating the after-valve-opening air quantity based upon these three parameters, it is possible to accurately estimate an air quantity flowing into the cylinder at the time of operating the intake control valve 23.

Herein, in the present embodiment, the valve opening period CA_Pw is adopted as one of the parameters, but this can replace the valve closing timing CA_Pc. Because from a relation of CA_Pc=CA_Po+CA_P_w, if one of both is defined, the other is automatically defined. Accordingly, in step S2305 in FIG. 33 and in the after-valve-opening air quantity in FIG. 35, the valve opening period CA_Pw may be replaced by the valve closing timing CA_pc.

In the second aspect, intake control valve controlling means, air quantity estimating means, control amount determining means, and before-valve-opening air quantity estimating means of the present invention is formed by the ECU 100, and pressure detecting means thereof is formed by the pressure sensor 55.

The present invention can be applied to any type of engine in addition to a gasoline engine. In a case of a gasoline engine, the present invention can be applied to, not limited to the direct injection type or the in-cylinder injection type as mentioned above, an intake passage-injection type engine or a so-called dual injection type engine in which both an intake passage injection and an in-cylinder injection are performed. And, the present invention can be applied to a diesel engine, or an engine using an alternative fuel such as alcohol or a liquid natural gas. The present invention can be applied to a supercharging engine where particularly in this case, since an intake manifold pressure is higher as compared to a natural aspiration, a pressure difference between an upstream side and a downstream side of an intake control valve can be increased, thus further promoting an inertia supercharging effect. A map as shown in the present embodiment can be replaced by a calculation expression.

An embodiment of the present invention is not limited to the aforementioned embodiments, but the present invention includes all modifications and applications included in the concept of the present invention defined in claims thereof, and its equivalents. Accordingly, the present invention should not be construed in a limited way, but can be applied to any other technology included within the scope of the concept of the present invention.

INDUSTRIAL APPLICABILITY

The present invention can be applied to an engine where an intake control valve is provided in an intake passage.

The invention claimed is:

1. A control apparatus for an engine comprising:
an intake control valve disposed in an intake passage at an upstream side of an intake valve to close the intake passage and also open/close in synchronization with opening/closing of the intake valve;
intake control valve controlling means which opens the intake control valve in the midst of an intake stroke and thereafter, closes the intake control valve; and
air quantity estimating means which estimates an air quantity flowing into a cylinder after the opening of the intake control valve, based upon opening timing of the intake control valve, closing timing or an opening period of the intake control valve and a pressure at a downstream side of the intake control valve at the opening timing of the intake control valve.

2. The control apparatus for the engine according to claim 1, wherein:

the air quantity estimating means determines the opening timing of the intake control valve and the closing timing or the opening period of the intake control valve, based upon an operating condition of the engine.

3. The control apparatus for the engine according to claim 1, wherein:
the air quantity estimating means estimates the air quantity according to a map using the opening timing, the opening period and the pressure as parameters.

4. The control apparatus for the engine according to claim 1, further comprising:
pressure detecting means which detects a pressure at the downstream side of the intake control valve, wherein:
the air quantity estimating means defines a pressure value detected at the opening timing of the intake control valve by the pressure detecting means or a pressure value estimated by the detected pressure value as the pressure.

5. The control apparatus for the engine according to claim 1, further comprising:
control amount determining means which determines a control amount based upon the air quantity estimated by the air quantity estimating means.

6. The control apparatus for the engine according to claim 1, wherein:
the intake control valve controlling means closes the intake control valves in such a manner as to retain a pressure different from an average pressure at the upstream side of the intake control valve or a pressure equal to the average pressure at the upstream side of the intake control valve in the intake passage between the intake control valve and the intake valve from an end of the intake stroke to the next intake stroke.

7. The control apparatus for the engine according to claim 6, further comprising:
before-valve-opening air quantity estimating means which estimates a before-valve-opening air quantity flowing into the cylinder before the opening of the intake control valve, based upon the retained pressure and the pressure at the downstream side of the intake control valve at a predetermined timing after the opening of the intake valve and also at or before the opening timing of the intake control valve.

8. The control apparatus for the engine according to claim 7, further comprising:
pressure detecting means which detects a pressure at the downstream side of the intake control valve, wherein:
the before-valve-opening air quantity estimating means defines a pressure value detected at a predetermined timing before the opening of the intake valve by the pressure detecting means as the retained pressure, and a pressure value detected at a predetermined timing after the opening of the intake valve and also at or before the opening timing of the intake control valve by the pressure detecting means as the pressure at the downstream side.

9. The control apparatus for the engine according to claim 7, further comprising:
control amount determining means which determines a control amount based upon a sum of the air quantity estimated by the air quantity estimating means and the before-valve-opening air quantity estimated by the before-valve-opening air quantity estimating means.

10. A control method for an engine comprising the steps of:
providing an intake control valve in an intake passage at an upstream side of an intake valve to close the intake passage and also open/close in synchronization with opening/closing of the intake valve;
opening the intake control valve in the midst of an intake stroke and thereafter, closing the intake control valve; and
estimating an air quantity flowing into a cylinder after the opening of the intake control valve, based upon opening timing of the intake control valve, closing timing or an opening period of the intake control valve and a pressure at a downstream side of the intake control valve at the opening timing of the intake control valve.

11. The control method for the engine according to claim 10, wherein:
the step of closing the intake control valve includes closing the intake control valves in such a manner as to retain a pressure greater than an average pressure at the upstream side of the intake control valve in the intake passage between the intake control valve and the intake valve from an end of the intake stroke to the next intake stroke, further comprising the step of:
estimating a before-valve-opening air quantity flowing into the cylinder before the opening of the intake control valve, based upon the retained pressure and the pressure at the downstream side of the intake control valve at a predetermined timing after the opening of the intake valve and also at or before the opening timing of the intake control valve.

12. The control method for the engine according to claim 10, further comprising the step of:
detecting a pressure at the downstream side of the intake control valve.

13. A control apparatus for an engine comprising:
an intake control valve disposed in an intake passage at an upstream side of an intake valve to dose the intake passage and also open/close in synchronization with opening/closing of the intake valve;
intake control valve controlling means which opens the intake control valve in the midst of an intake stroke and thereafter, closes the intake control valve;
target air quantity determining means which determines a target value of an after-valve-opening air quantity flowing into a cylinder after the opening of the intake control valve, based upon an operating condition of the engine;
pressure detecting means which detects a pressure at a downstream side of the intake control valve;
pressure estimating means which estimates, based upon the downstream-side pressure detected before the opening of the intake control valve by the pressure detecting means, a downstream-side pressure after that detection timing; and
target valve-opening-timing determining means which determines a target value of opening timing of the intake control valve, based upon the downstream-side pressure estimated by the pressure estimating means and the target value of the after-valve-opening air quantity.

14. The control apparatus for the engine according to claim 13, wherein:
the pressure estimating means estimates a downstream-side pressure of the intake control valve after the final detection time, based upon at least one of the downstream-side pressures detected by the pressure detecting means before the opening of the intake control valve.

15. The control apparatus for the engine according to claim 13, further comprising:

downstream-side pressure determining means which determines the downstream-side pressure at the target value of the valve opening timing based upon the target value of the after-valve-opening air quantity and the target value of the valve opening timing.

16. The control apparatus for the engine according to claim 13, further comprising:
target valve-opening-period determining means which determines a target value of a valve opening period of the intake control valve based upon the target value of the valve opening timing, the downstream-side pressure at the target value of the valve opening timing and the target value of the after-valve-opening air quantity.

17. The control apparatus for the engine according to claim 16, wherein:
the target valve-opening timing determining means and the target valve-opening period determining means respectively determine the respective target values of the valve opening timing and the valve opening period based upon a map predetermining a relation of the after-valve-opening air quantity, the downstream-side pressure, the valve opening timing and the valve opening period.

18. The control apparatus for the engine according to claim 16, further comprising:
valve-opening detecting means which detects an actual opening of the intake control valve; and
target valve-closing timing determining means which determines a target value of the closing timing of the intake control valve based upon timing when the actual opening is detected by the valve-opening detecting means and the target value of the valve opening period.

19. The control apparatus for the engine according to claim 18, further comprising:
valve closing detecting means which detects an actual valve closing when the intake control valve controlling means closes the intake control valve at the target value of the valve closing timing determined by the target valve-closing timing determining means;
actual valve-opening-period determining means which determines an actual valve opening period of the intake control valve, based upon the timing when the actual valve closing is detected by the valve-closing detecting means and the timing when the actual valve opening is detected; and
actual air quantity estimating means which estimates an actual air quantity based upon the actual valve opening period determined by the actual valve-opening-period determining means, the timing when the actual valve opening is detected, and the downstream-side pressure detected by the pressure detecting means at the timing when the actual valve opening is detected.

20. The control apparatus for the engine according to claim 19, further comprising:
control amount determining means which determines a control amount based upon the actual air quantity estimated by the actual air quantity estimating means.

21. A control apparatus for an engine comprising:
an intake control valve disposed in an intake passage at an upstream side of an intake valve to close the intake passage and also open/close in synchronization with opening/closing of the intake valve;
intake control valve controlling means which opens the intake control valve in the midst of an intake stroke and thereafter, closes the intake control valve;

target air quantity determining means which determines a target value of an after-valve-opening air quantity flowing into a cylinder after the opening of the intake control valve, based upon an operating condition of the engine;
pressure detecting means which detects a pressure at a downstream side of the intake control valve;
pressure estimating means which estimates, based upon the downstream-side pressure detected before the opening of the intake control valve by the pressure detecting means, a downstream-side pressure after that detection timing;
target valve-opening-timing determining means which determines a target value of opening timing of the intake control valve, based upon the downstream-side pressure estimated by the pressure estimating means and the target value of the after-valve-opening air quantity;
target valve-opening-period determining means which determines a target value of an opening period of the intake control valve based upon the target value of the valve opening timing determined by the target-valve-opening-timing determining means, the downstream-side pressure at the target value of the valve opening timing, and the target value of the after-valve-opening air quantity;
valve-opening detecting means which detects an actual opening of the intake control valve when the intake control valve is opened by the intake control valve controlling means at the target value of the valve opening timing; and
target valve-closing timing determining means which determines a target value of the closing timing of the intake control valve based upon timing when the actual opening is detected by the valve-opening detecting means and the target value of the valve opening period.

22. The control apparatus for the engine according to claim 13, wherein:
the target air quantity determining means determines a target. value of the air quantity based upon an operating condition of the engine and also subtracts the estimation value of the before-valve-opening air quantity flowing into the cylinder before the opening of the intake control valve from the target value of the air quantity to determine the target value of the after-valve-opening air quantity.

23. The control apparatus for the engine according to claim 22, wherein:
the target air quantity determining means estimates the before-valve-opening air quantity, based upon at least two downstream-side pressures detected before the opening of the intake control valve by the pressure detecting means.

24. The control apparatus for the engine according to claim 23, wherein:
at least one downstream-side pressure of at least the two downstream-side pressures includes the downstream-side pressure detected before the opening of the intake valve by the pressure detecting means.

* * * * *